(12) United States Patent
Nasu

(10) Patent No.: US 11,157,333 B2
(45) Date of Patent: Oct. 26, 2021

(54) DATA PROCESSING DEVICE, DATA PROCESSING SYSTEM, DATA PROCESSING METHOD, AND PROGRAM

(71) Applicant: Mitsubishi Electric Corporation, Tokyo (JP)

(72) Inventor: Osamu Nasu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/252,758

(22) PCT Filed: Jun. 21, 2018

(86) PCT No.: PCT/JP2018/023701
§ 371 (c)(1),
(2) Date: Dec. 16, 2020

(87) PCT Pub. No.: WO2019/244312
PCT Pub. Date: Dec. 26, 2019

(65) Prior Publication Data
US 2021/0255906 A1    Aug. 19, 2021

(51) Int. Cl.
*G06F 9/54* (2006.01)
*G06F 21/60* (2013.01)
*G06F 16/25* (2019.01)

(52) U.S. Cl.
CPC ............. *G06F 9/54* (2013.01); *G06F 16/258* (2019.01); *G06F 21/602* (2013.01)

(58) Field of Classification Search
None
See application file for complete search history.

(56) References Cited

U.S. PATENT DOCUMENTS 8,542,823 B1 * 9/2013 Nguyen ................ G06F 21/602
380/42
2010/0057826 A1    3/2010 Chow et al.
(Continued)

FOREIGN PATENT DOCUMENTS

CN    104866936 A    8/2015
JP    2004-62574 A    2/2004
(Continued)

OTHER PUBLICATIONS

Office Action dated Feb. 11, 2020, received for TW Application No. 108120024, 15 pages including English Translation.
(Continued)

*Primary Examiner* — Craig C Dorais
(74) *Attorney, Agent, or Firm* — Xsensus LLP

(57) ABSTRACT

A data processing device (10) is to be connected to another data processing device (20) and includes a first communicator (180) to share flow settings information for executing a first partial processing and a second partial processing included in a processing flow with the another data processing device (20), an execution controller (140) to cause a processing unit (130) to execute the first partial processing in accordance with the flow settings information, and a second communicator (190) to execute at least one of transmission of a first processing result obtained by execution of the first partial processing to the another data processing device (20) or reception of a second processing result obtained by execution of the second partial processing by the another data processing device (20).

14 Claims, 20 Drawing Sheets

(56) References Cited

U.S. PATENT DOCUMENTS

2015/0261721 A1\* 9/2015 Babbellapati ........... G06F 15/76
712/30
2020/0081754 A1\* 3/2020 Booth ................ G06K 9/00711

FOREIGN PATENT DOCUMENTS

| JP | 2004-171540 A | 6/2004 |
| --- | --- | --- |
| JP | 2010-55610 A | 3/2010 |
| JP | 2012-168821 A | 9/2012 |
| JP | 2017-157189 A | 9/2017 |

OTHER PUBLICATIONS

Chinese Office Action dated May 14, 2021, in corresponding Chinese Patent Application No. 201880094693.1.

\* cited by examiner

FIG.5

FLOW SETTINGS INFORMATION 1511

| PARTIAL PROCESSING ID | PLATFORM ID | PROCESSING NAME | PRECEDING PROCESSING | PROCEEDING PROCESSING | INPUT DATA | OUTPUT DATA |
|---|---|---|---|---|---|---|
| 411 | 50 | COLLECTING | — | PROCESSING | FLOAT16 * 2 | FLOAT16 * 2 |
| 412 | 50 | PROCESSING | COLLECTING | DIAGNOSING | FLOAT 16 * 2 | INT16 * 2 |
| 421 | 51 | DIAGNOSING | PROCESSING | OUTPUTTING | INT16 * 2 | INT8 * 1 |
| 422 | 51 | OUTPUTTING | DIAGNOSING | — | INT8 * 1 | BOOL * 1 |

| FLOW SETTINGS INFORMATION ||||||
| PARTIAL PROCESSING ID | DEVICE ID | PRECEDING PROCESSING | INPUT DATA | OUTPUT DATA |
| --- | --- | --- | --- | --- |
| 411 | 10 | — | FLOAT16 * 2 | FLOAT16 * 2 |
| 412 | 10 | COLLECTING | FLOAT 16 * 2 | INT16 * 2 |
| 421 | 20 | PROCESSING | INT16 * 2 | INT8 * 1 |
| 422 | 20 | DIAGNOSING | INT8 * 1 | BOOL * 1 |

DATA PROCESSING DEVICE, DATA PROCESSING SYSTEM, DATA PROCESSING METHOD, AND PROGRAM

CROSS-REFERENCE TO RELATED APPLICATION

The present application is based on PCT filing PCT/JP2018/023701, filed Jun. 21, 2018, the entire contents of which are incorporated herein by reference.

TECHNICAL FIELD

The present disclosure relates to a data processing device, a data processing system, a data processing method, and a program.

BACKGROUND ART

In a facility such as a factory, various processing systems such as a production system, a machining system, and an inspection system are formed. There are multiple partial processings in the processing flow of such a processing system and the multiple partial processings are applied to data in succession. Examples of the partial processing in the processing flow include collecting, processing, and diagnosing of data. Here, there is demand to achieve a flexible processing flow by having a user freely combine the partial processings to be applied to the data.

Therefore, use of a technique in which dedicated job software that is different from base software of a control device is embedded in the control device is conceivable (see Patent Literature 1, for example). Although the technique of Patent Literature 1 does not take into account the combining of partial processings, a portion of the processing to be executed by the control device is separated to be executed as the job software. The technique of Patent Literature 1 enables the processing flow to be carried out by the control device to be changed by replacing job software.

CITATION LIST

Patent Literature

Patent Literature 1: Unexamined Japanese Patent Application Publication No. 2017-157189

SUMMARY OF INVENTION

Technical Problem

To execute the processing flow, it is imperative to achieve a processing flow in which multiple devices are linked together in a case where data processed by devices installed in locations away from each other are to be integrated and in a case where data applied with partial processing by a single device is to be further applied with partial processing suited to be executed by another device. However, with the technique of Patent Literature 1, a processing flow in which multiple devices are linked together cannot be executed because no consideration whatsoever is given to linking multiple devices together.

The present disclosure is made with the view of the above circumstances, and an objective of the present disclosure is to execute a processing flow in which multiple devices are linked together.

Solution to Problem

In order to achieve the aforementioned objective, a data processing device of the present disclosure to be connected to another data processing device includes:

first communication means for sharing with the another data processing device flow settings information for executing a first partial processing and a second partial processing that are included in a processing flow;

execution control means for causing processing means to execute the first partial processing in accordance with the flow settings information; and second communication means for executing at least one of transmission of a first processing result obtained by execution of the first partial processing to the another data processing device or reception of a second processing result obtained by execution of the second partial processing by the another data processing device.

Advantageous Effects of Invention

The data processing device of the present disclosure includes the first communication means for sharing the flow settings information with the another data processing device and the execution control means for causing the processing means to execute the first partial processing in accordance with the flow settings information. Therefore, execution of multiple partial processings in the processing flow can be executed by multiple data processing devices. That is, a processing flow in which multiple devices are linked together can be executed.

BRIEF DESCRIPTION OF DRAWINGS

FIG. 5 is a diagram illustrating an example of flow settings information according to the embodiment;

FIG. 7 is a diagram illustrating an example in which data formats of flow settings information according to the embodiment are changed;

DESCRIPTION OF EMBODIMENTS

Hereinafter, a data processing device 10 according to an embodiment of the present disclosure is described in detail with reference to the drawings.

Embodiment 1

The data processing device 10 according to the embodiment is an industrial computer to be installed in a factory. The data processing device 10 links together with the other data processing device 20, and executes a processing flow including a series of partial processings. The processing flow to be executed by the data processing devices 10 and 20 is control processing for causing a production line that produces products to nm.

Figure 1:
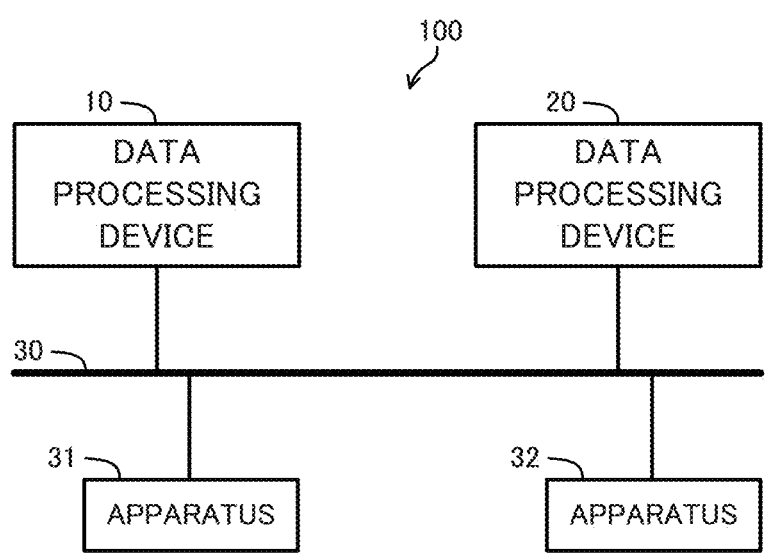
FIG. 1 is a block diagram illustrating a configuration of a data processing system according to an embodiment of the present disclosure.

The data processing device 10, as illustrated in FIG. 1, is included together with the data processing device 20 in the data processing system 100. The data processing system 100 includes apparatuses 31 and 32 in addition to the data processing devices 10 and 20.

The data processing devices 10 and 20 and the apparatuses 31 and 32 are connected together via a communication path 30, thereby enabling communication with one another. The communication path 30 is an industrial control network achieved by a communication line installed within the factory. The communication path 30 may be an information network such as a local area network (LAN). The communication path 30 may be a dedicated line or may be a wide-area network such as the Internet. Further, although the data processing devices 10 and 20 and the apparatuses 31 and 32 are connected together via a single distribution path in FIG. 1, this is not limiting. For example, the data processing device 10 may be connected with the apparatuses 31 and 32 via the dedicated line and the data processing device 10 and the data processing device 20 may be connected via the wide-area network.

The data processing device 20 is an industrial computer having a configuration substantially the same as that of the data processing device 10. The apparatus 31 is a sensor device installed on the production line and includes, for example, a sensor that measures physical quantity such as pressure, ultrasound, and light. The apparatus 31 periodically outputs data indicating a measurement result obtained by the sensor to the communication path 30. The cycle at which the apparatus 31 outputs the measurement result is for example, 1 ms, 100 ms, or 1 sec. The apparatus 32 is an actuator or a robot installed on the production line and operates in accordance with a control command serving as an execution result of the processing flow.

Figure 2:
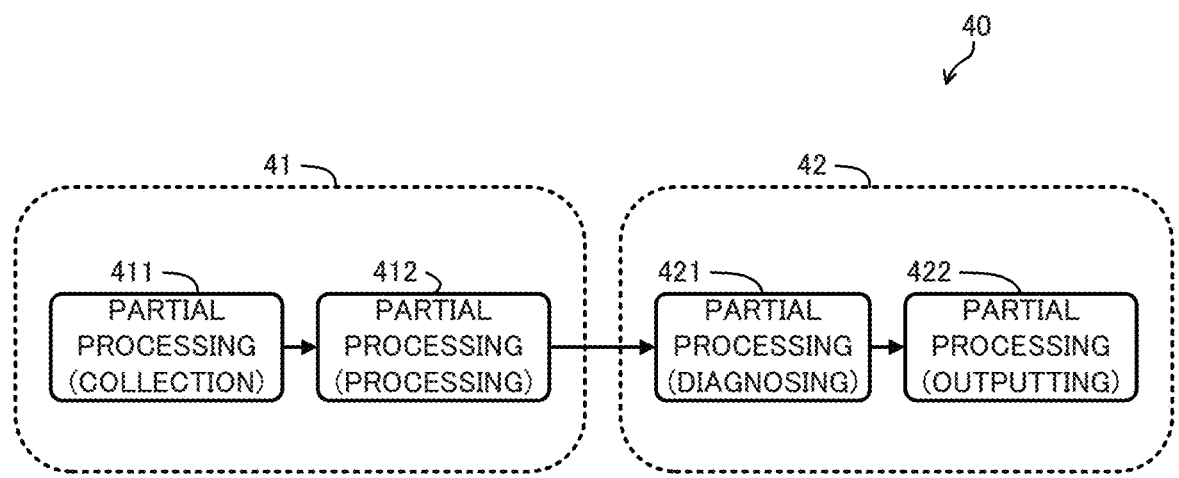
FIG. 2 is a diagram illustrating an example of a processing flow according to the embodiment.

A processing flow 40 to be executed by the data processing devices 10 and 20 is illustrated in FIG. 2. This processing flow 40 includes a series of partial processings to be applied to data collected from the apparatus 31. Specifically, the processing flow 40 includes a first partial processing 41 to be executed by the data processing device 10 and a second partial processing 42 to be executed by the data processing device 20. The processing flow is not limited to these. The first partial processing 41 may be executed by the data processing device 20 and the second partial processing 42 may be executed by the data processing device 10.

Also, the first partial processing 41 includes a partial processing 411 and a partial processing 412 as element processings and the second partial processing 42 includes a partial processing 421 and a partial processing 422 as element processings. The partial processing 411 is equivalent to processing in which data is collected from the apparatus 31 and the partial processing 412 is equivalent to processing in which data to be output as a result from the partial processing 411 is processed. The processing of data of the partial processing 412 is, for example, reduction processing of noise or rounding processing. The partial processing 421 is equivalent to processing in which diagnosis regarding data to be output as a result of the partial processing 412 is performed. Examples of diagnosis of data include determining a control command with respect to the apparatus 32 and determining whether or not an abnormality is present. The partial processing 422 is equivalent to outputting externally data indicating the diagnosis result to be outputted as a result of the partial processing 421. Examples of outputting the diagnosis result include transmitting a control command to the apparatus 32. According to the processing flow 40 illustrated in FIG. 2, the series of processing including partial processings 411, 412, 421, and 422 that is executed each time a measurement result is output from the apparatus 31. Then, the control details with respect to the apparatus 32 are determined in accordance with the value obtained by reducing the noise included in the measurement result and the control command is transmitted.

Figure 3:
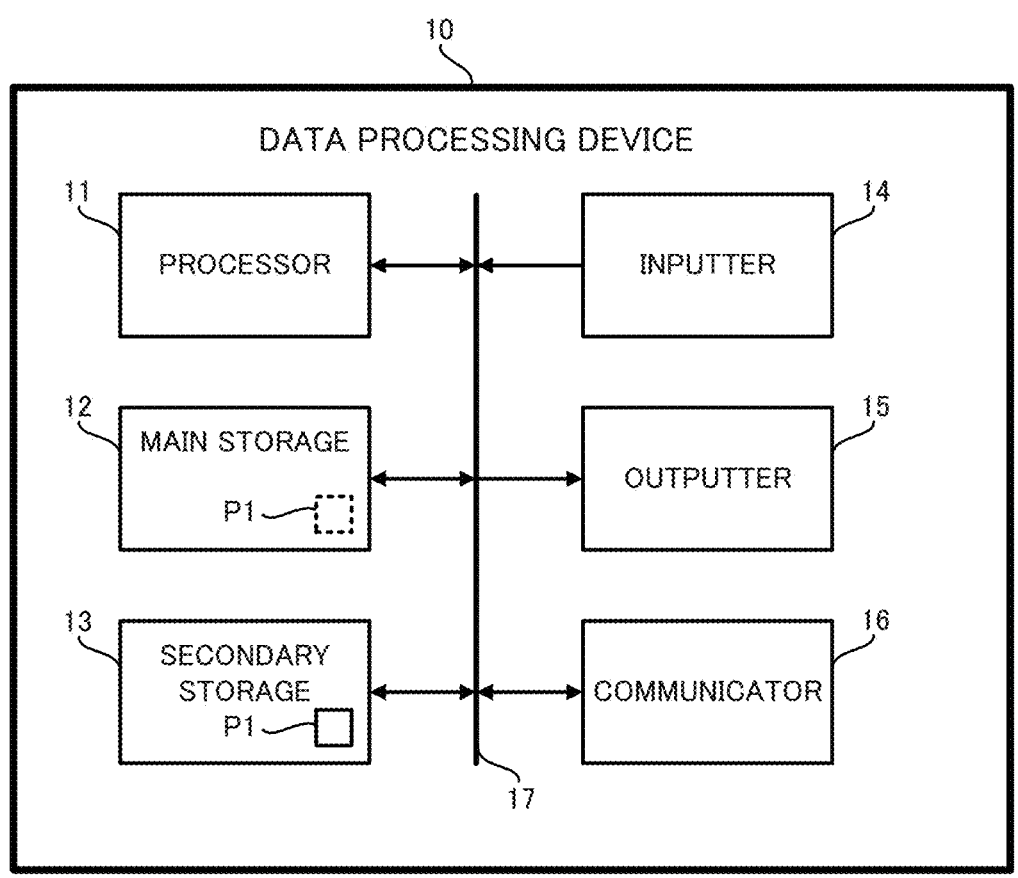
FIG. 3 is a block diagram illustrating a hardware configuration of a data processing device according to the embodiment.

The data processing device 10 includes a processor 11, a main storage 12, a secondary storage 13, an inputter 14, an outputter 15, and a communicator 16 as the hardware configuration as illustrated in FIG. 3. The main storage 12, the secondary storage 13, the inputter 14, the outputter 15, and the communicator 16 are all connected to the processor 11 via an internal bus 17.

The processor 11 includes a central processing unit (CPU). The processor 11 achieves the various functions of the data processing device 10 by executing a program P1 to be stored into the secondary storage 13 and executes processing described further below.

The main storage 12 includes a random-access memory (RAM). The program P1 is loaded from the secondary storage 13 into the main storage 12. Then, the main storage 12 is used as a working area of the processor 11.

The secondary storage 13 includes non-volatile memory. Examples of the non-volatile memory include an electrically erasable programmable read-only memory (EEPROM) and a hard disk drive (HDD). In addition to the program P1, the main storage device 13 stores various types of data to be used during processing by the processor 11. The secondary storage 13, in accordance with instructions of the processor 11, provides the processor 11 with data to be used by the processor 11, and stores the data provided by the processor 11. In FIG. 3, although a single program P1 is illustrated in representative fashion, the secondary storage 13 may store therein multiple programs and multiple programs may be loaded into the main storage 12.

The inputter 14 includes an inputting device. Examples of the inputting device include an input key and a pointing device. The inputter 14 acquires information inputted by a user of the data processing device 10, and provides a notification of the acquired information to the processor 11.

The outputter 15 includes an outputting device. Examples of the outputting device include a liquid crystal display (LCD) and a speaker. The outputter 15 presents various types of information to the user in accordance with instructions of the processor 11.

The communicator 16 includes a network interface circuit for communicating with an external device. The communicator 16 receives external signals and outputs data indicating these signals to the processor 11. The communicator 16 also transmits signals indicating data output by the processor 11 to the external device.

Figure 4:
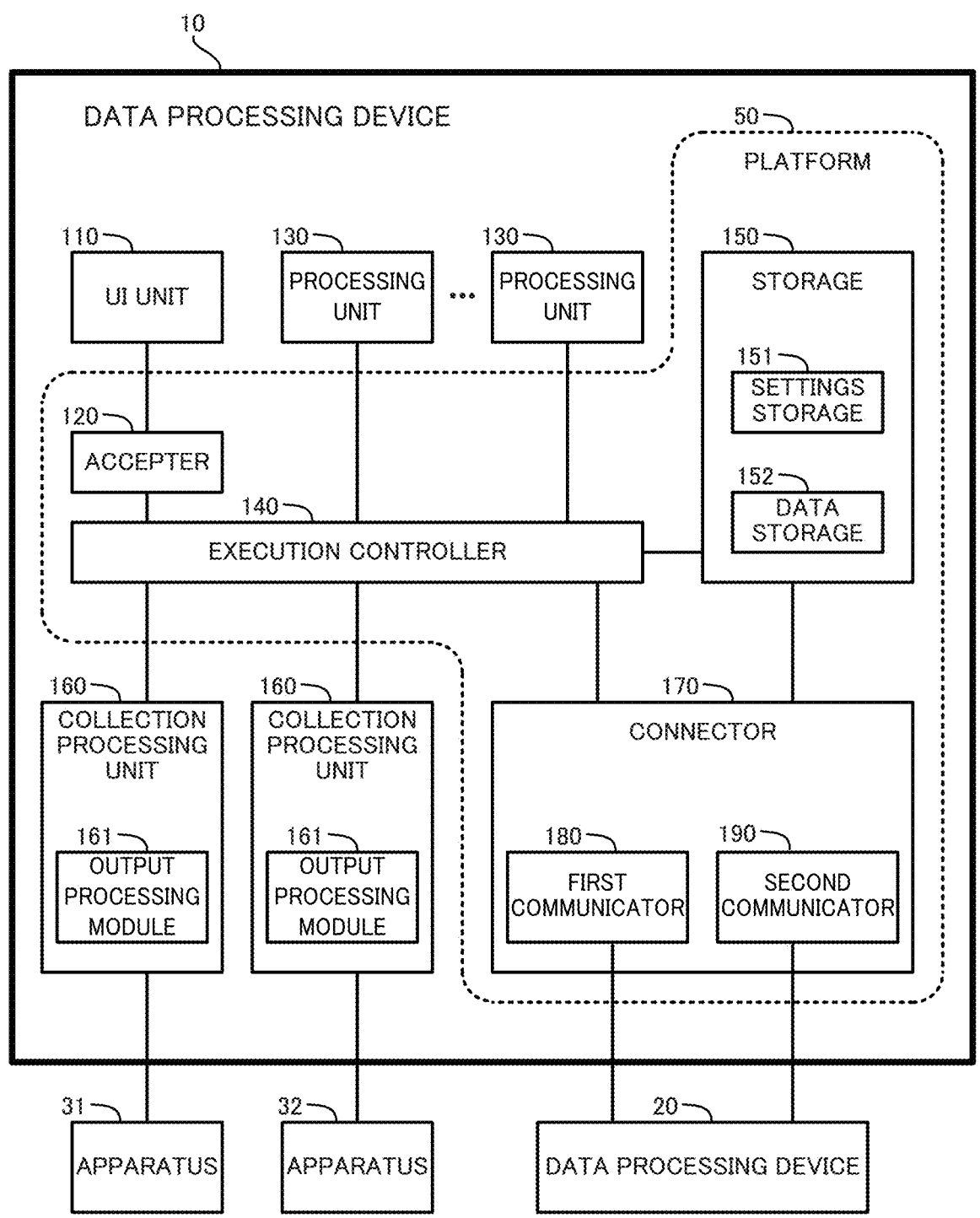
FIG. 4 is a diagram illustrating a functional configuration of the data processing device according to the embodiment.

The data processing device 10 performs various functions through cooperation between the components of the hardware configuration illustrated in FIG. 3. Specifically, the data processing device 10 functionally includes, as illustrated in FIG. 4, a user interface (UI) unit 110 for the user to input settings of the processing flow, an accepter 120 to accept settings of the processing flow, processing units 130 to execute partial processing included in the processing flow, an execution controller 140 to cause the processing units 130 and collection processing units 160 to execute partial processing, a storage 150 to store various types of data, the collection processing units 160 to collect data, and a connector 170 for connecting to the data processing device 20.

The accepter 120, the execution controller 140, the storage 150, and the connector 170 together form a platform 50 for executing the processing flow. This platform 50 links to a platform in the data processing device 20, and executes the processing flow. The platform in the data processing device 20 is similar to that of the data processing device 10.

The UI unit 110 is equivalent to a touchscreen achieved mainly by the inputter 14 and the outputter 15. The UI unit 110 displays to a user, in accordance with controls by the accepter 120, a screen for inputting settings of the processing flow. The user operates the UI unit 110, and freely sets details and a number of partial processings to be included in the processing flow, parameters necessary for execution of partial processing and a platform to execute the partial processing. Then, the UI unit 110 sends information indicating settings of the processing flow inputted through operations performed by the user to the accepter 120. The UI unit 110 may be achieved by a pointing device. Examples of the pointing device include a display, keyboard, and a mouse.

The accepter 120 is achieved mainly by the processor 11. The accepter 120 accepts settings of the processing flow from the UI unit 110, and provides a notification to the execution controller 140 as flow settings information indicating the setting details. The flow settings information notified to the execution controller 140 is stored into a settings storage 151 of the storage 150. The accepter 120 functions as accepting means in the Claims.

The settings of the processing flow are not necessarily accepted by the accepter 120. There are also instances in which a user operates the data processing device 20 instead of the UI unit 110 of the data processing device 10 to input the settings of the processing flow. It is sufficient as long as a user operates a desired device that is either the data processing device 10 or the data processing device 20. In a case where the user uses the data processing device 20 to input settings of the processing flow, sharing is executed by the data processing device 10 receiving flow settings information indicating the settings of this processing flow from the data processing device 20. This sharing is described in detail further below.

The processing units 130 are mainly achieved by the processor 11. The processing units 130 are achieved by the program P1 set in advance in the data processing device 10 or plug-in software prepared by the user. Each processing unit 130 executes a partial processing as an element that is included in the processing flow. Specifically, each processing unit 130 acquires data to be inputted by the execution controller 140 as a target of the partial processing and outputs a result of applying partial processing to the corresponding acquired data to the execution controller 140. In FIG. 2, partial processing 412 within the first partial processing 41 that is to be executed by the data processing device 10 is executed by one of the processing units 130. The processing unit 130 functions as processing means in the Claims.

The execution controller 140 is mainly achieved by the processor 11. The execution controller 140 causes the processing units 130 and the collection processing units 160 to execute the partial processings in an order in accordance with the flow settings information. Specifically, the execution controller 140 acquires data to serve as the target of partial processing from the collection processing units 160, the processing units 130, and the connector 170, and sends the acquired data to one of the processing units 130 or one of the collection processing units 160 that is to apply partial processing to the data, or the connector 170. The execution controller 140 functions as execution control means in the Claims.

For example, the execution controller 140 acquires from the collection processing unit 160 data collected as a result of the partial processing 411 illustrated in FIG. 2, and sends the acquired data to the processing unit 130 that is to execute partial processing 412. Also, the execution controller 140 acquires from the processing unit 130 data outputted as a result of the partial processing 412, and transmits the acquired data to the data processing device 20 via the connector 170.

In a case where the second partial processing 42 within the processing flow 40 illustrated in FIG. 2 is to be executed by the data processing device 10, the execution controller 140 acquires data indicating a result of the partial processing 412 from the data processing device 20 via the controller 170, and sends the acquired data to one of the processing units 130 that is to execute the partial processing 421. Also, the execution controller 140 acquires data outputted from the processing unit 130 as a result of the partial processing 421 and transmits the acquired data to one of the collection processing units 160 that is to execute the partial processing 422.

The storage 150 is mainly achieved by the secondary storage 13. The storage 150 includes a settings storage 151 to store therein flow settings information and a data storage 152 to store therein accumulation data which is described further below. The settings storage 151 and the data storage 152 may be storage regions different from each other formed in a single storage device or may be achieved by different storage devices. The settings storage 151 functions as settings storing means in the Claims. The data storage 152 functions as data storing means in the Claims.

Flows settings information 1511 to be stored into the settings storage 151 is illustrated in FIG. 5. This flow settings information 1511 is information indicating settings necessary for executing the processing flow illustrated in FIG. 2. The flow settings information 1511 is table data having a partial processing ID for identifying partial processing, a platform ID for identifying a platform on which this partial processing is executed, a name of this partial processing, a partial processing corresponding to the preceding processing of this partial processing, a partial processing corresponding the proceeding processing of this partial processing, a type of data that is to be input into this partial processing, a type of data that is to be output from this partial processing in association with one another.

The partial processing ID in FIG. 5 is an identifier equivalent to a number assigned to partial processing in FIG. 2. Also, the number "50" among the platform IDs is an identifier equivalent to the platform 50 sign of the data processing device 10 illustrated in FIG. 4. The platform ID "51" corresponds to a platform of the data processing device 20. The flow settings information 1511 may include an identifier identifying one of the data processing devices 10 and 20 instead of the platform ID. The information "FLOAT 16*2" with respect to the input data and the output data refers to two 16-bit floating-point pieces of data. Likewise, the information "INT8*1" represents a single 8-bit integer piece of data, whereas "BOOL*1" represents a single Boolean piece of data.

The flow settings information 1511 may include information different from that illustrated in FIG. 5. For example, the flow settings information 1511 may include parameters defining details of the partial processing. These parameters are, for example, thresholds to be used for rounding processing, identifiers of apparatuses by which data is to be collected, cycles for collecting data, and identifiers of apparatuses to which control commands are to be transmitted.

Referring back to FIG. 4, the collection processing units 160 are mainly achieved by cooperation between the processor 11 and the communicator 16. As illustrated in FIG. 4, although one collection processing unit 160 is provided for the apparatus 31 and the other collection processing unit 160 is provided for the apparatus 32, a collection processing unit 160 may be provided for each distribution path to which a data processing device 10 is connected. The collection processing unit 160 collects data to be outputted from the connected apparatus 31, and sends the collected data to the execution controller 140. The collection processing unit 160, similarly to the processing unit 130, functions as processing means in the Claims.

Also, the collection processing unit 160 includes an output processing module 161 for outputting output information. The output information is information regarding the execution result of the processing flow. For example, the output processing module 161 transmits, as output information, a control command sent from the execution controller 140 to the apparatus 32 that is the control target. The output processing by the output processing module 161 is equivalent to the partial processing 422 illustrated in FIG. 2. The output information is not limited to the control command. The output information may be a notification for reporting an abnormality occurrence or may be quality management information to be stored into an external server device.

The connector 170 is mainly achieved by cooperation between the processor 11 and the communicator 16. The connector 170 communicates in order for the data processing device 10 and the data processing device 20 to link together and execute the processing flow. The connector 170 includes a first communicator 180 to perform communication necessary for off-line processing with the data processing device 20 and includes a second communicator 190 to perform communication for executing on-line processing with the data processing device 20. The first communicator 180 functions as first communication means in the Claims and the second communicator 190 functions as second communication means in the Claims.

Here, the off-line processing means processing that is required for executing the processing flow but non-essential for communication between the data processing device 10 and the data processing device 20 during execution. The off-line processing includes the referencing of the flow settings information. As long as the flow settings information is pre-shared between the data processing devices 10 and 20 before starting the processing flow, communication is non-essential when reading the flow settings information. The off-line processing also includes partial processing in which one of the data processing devices 10 and 20 reads the accumulation data accumulated in the other one of the processing devices 10 and 20. As long as this accumulation data is transmitted in advance between the data processing device 10 and the data processing device 20, communication is non-essential when reading the accumulation data.

Also, the on-line processing refers to partial processing to be executed under the condition in which the data processing device 10 and the data processing device 20 are connected to each other. Specifically, in a case where the distributing of a result of a single partial processing from one of the data processing devices 10 and 20 to the other one of the data processing devices 10 and 20 and the inputting of the result into the next partial processing are executed repeatedly in an on-line state, the next partial processing in this case is equivalent to on-line processing.

Figure 6:
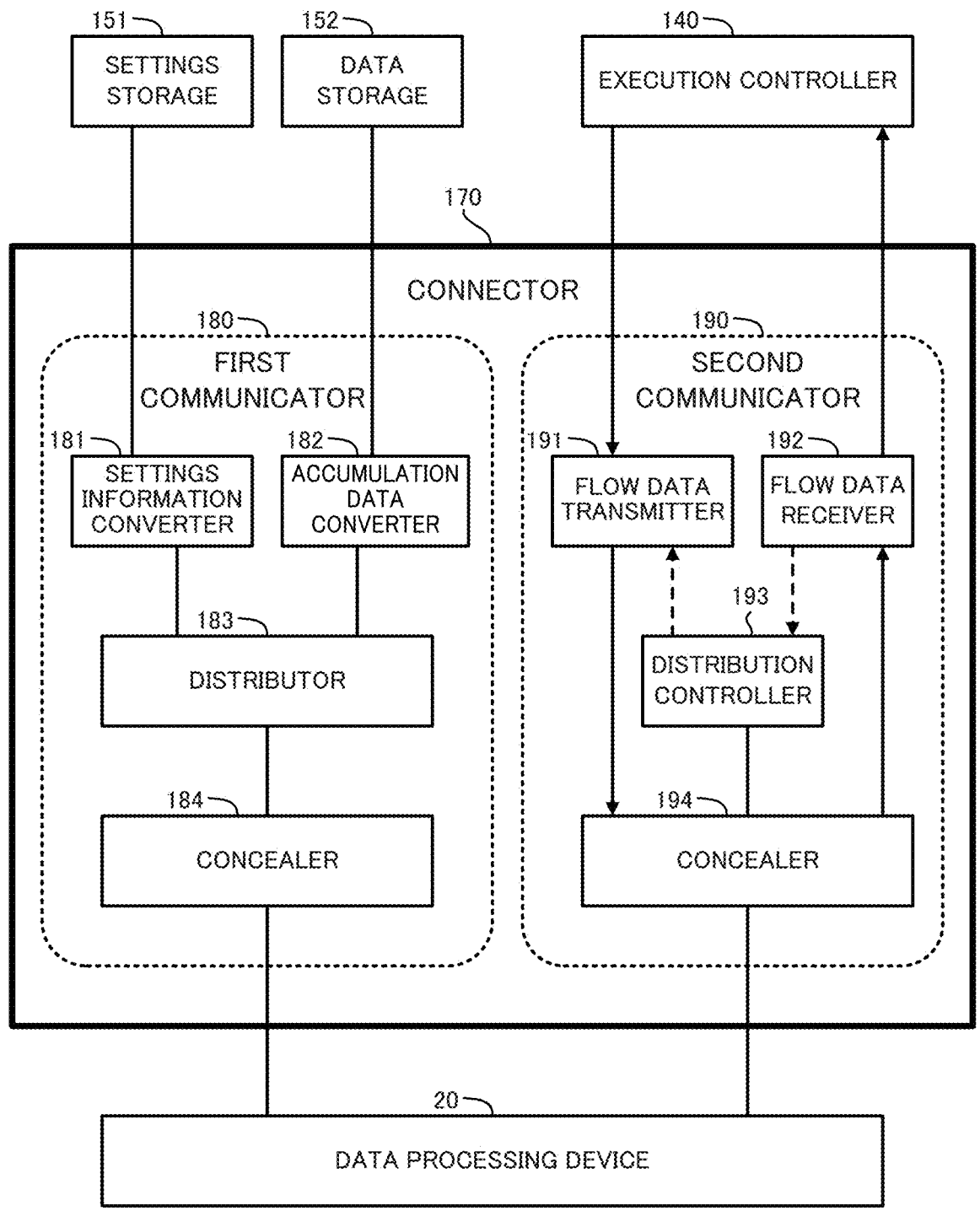
FIG. 6 is a diagram illustrating a configuration of a connector according to the embodiment.

FIG. 6 illustrates the detailed configurations of the first communicator 180 and the second communicator 190 of the connector 170. As illustrated in FIG. 6, the first communicator 180 includes a settings information converter 181 to convert the format of the flow settings information, an accumulation data converter 182 to convert the format of the accumulation data, a distributor 183 to distribute the data, and a concealer 184 to encrypt and decrypt the data.

When flow settings information is to be distributed on the communication path 30 in order to share the flow settings information between the data processing devices 10 and 20, the settings information converter 181 converts the data format of this flow settings information into a format suitable for a device that is the transmission destination. Specifically, the settings information converter 181 reads the flow settings information stored in the settings storage 151, converts the data format of this flow settings information into a format corresponding to data processing device 20, and sends the converted flow settings information to the distributor 183. The data format of the flow settings information may be a so-called file format or another format. Also, the settings information converter 181 may convert the format of the flow settings information received from the data processing device 20 by the distributor 183 to a format corresponding to the execution controller 140 and send the converted flow settings information to the execution controller 140.

FIG. 7 illustrates a flow settings information 1512 file-format converted by the settings information converter 181. This flow settings information 1512 includes device IDs instead of the platform IDs of the flow settings information 1511 illustrated in FIG. 5. The device ID is for identifying a device that is to execute partial processing. The device IDs in FIG. 7 are identifiers equivalent to the numbers of the data processing devices 10 and 20. Also, in the flow settings information 1512, the "proceeding processing" included in the flow settings information 1511 is omitted.

The settings information converter 181 may acquire the data format corresponding to the data processing device 20 by input by a user or may acquire the data format corresponding to the data processing device 20 by issuing a request to the data processing device 20. Also, assuming that the flow settings information is distributed in accordance with a common standard on the communication path 30, the settings information converter 181 may convert the format of the flow settings information to a data format in accordance with this common standard.

Referring back to FIG. 6, when accumulation data is to be distributed on the communication path 30 in order to share this accumulation data between the data processing devices 10 and 20, the accumulation data converter 182 converts format of the accumulation data into a format suitable for the device that is the transmission destination. Specifically, the accumulation data converter 182 converts the format of the accumulation data received from the data processing device 20 by the distributer 183 into a format corresponding to the execution controller 140, and sends the converted accumulation data to the execution controller 140. The data format of the accumulation data may be the so-called file format or another format. Also, the accumulation data converter 182 may read the accumulation data stored in the data storage 152, convert the format of this accumulation data into a format corresponding to the data processing device 20, and send the converted accumulation data to the distributor 183.

The distributor 183 acquires flow settings information read from the settings storage 151 via the settings information converter 181, and acquires accumulation data read from the data storage 152 via the accumulation data converter 182. Then, the distributor 183 transmits the acquired flow settings information and the accumulation data to the data processing device 20 via a concealer 194. Also, the distributor 183 writes the flow settings information and the accumulation data received via the concealer 194 from the data processing device 20 into settings storage 151 and the data storage 152 via the accumulation data converter 182.

The concealer 184 achieves an encrypted communication in the communication path 30. Specifically, the concealer 184 encrypts data transmitted from the distributor 183, and transmits the encrypted data to the communication path 30. Also, the concealer 184 decrypts data received from the communication path 30, and sends the decrypted data to the distributor 183. The method of encryption communication by the concealer 184 may be a public-key cryptography method or may be a private-key cryptography method.

The second communicator 190 includes a flow data transmitter 191 to transmit data to serve as the target of partial processing by the data processing device 20, a flow data receiver 192 to receive data that is to serve as the target of partial processing by the data processing device 10, a distribution controller 193 to control the transmission of data by the flow data transmitter 191 and the flow data receiver 192, and a concealer 194 to encrypt and decrypt data.

The flow data transmitter 191 acquires transmission data from the execution controller 140, and transmits the transmission data to the data processing device 20 via the concealer 194. The transmission data indicates a result of the first partial processing 41 executed by the data processing device 10 in accordance with the flow settings information. The flow data transmitter 191 stands-by suspending transmission when transmission is restricted by the distribution controller 193.

Here, the flow data refers to the data inputted for or outputted by partial processing in accordance with the processing flow, whereas transmission data refers to flow data transmitted from the data processing device 10 to the data processing device 20. Hereinafter, the transmission data is appropriately referred to as the first processing result. Also, the flow data that is received by the data processing device 10 from the data processing device 20 is referred to as reception data. This reception data indicates the result of the second partial processing 42 executed by the data processing device 20. Hereinafter, the reception data is appropriately referred to as the second processing result.

The flow data receiver 192 receives from the data processing device 20 via the concealer 194, the second processing result that is to serve as the target of partial processing to be executed by the data processing device 10 in accordance with the flow settings information, and sends the second processing result to the execution controller 140. Upon receiving the second processing result, the flow data receiver 192 notifies the distribution controller 193 that the second processing result is received.

In a case where it is estimated that the communication path 30 is congested based on the reception conditions of data by the flow data receiver 192, the distribution controller 193 restricts transmissions of data by the flow data transmitter 191. Specifically, in a case where the reception cycle of data by the flow data receiver 192 is different from the cycle indicated by the flow settings information or in a case where the reception cycle of the data by the flow data receiver 192 is different from the cycle in a predetermined period of time in the past, the distribution controller 193 estimates that the communicator 30 is congested.

When the flow data receiver 192 received data, the distribution controller 193 may notify the data processing device 20 that data arrived at the data processing device 10. Also, the distribution controller 193 may issue a request to the data processing device 20 for a notification that the data transmitted by the flow data transmitter 191 arrived at the data processing device 20. The distribution controller 193 may execute so-called congestion control or flow control.

The concealer 194 achieves encryption communication in the communication path 30. Specifically, the concealer 194 encrypts data sent from the flow data transmitter 191 and transmits the encrypted data to the communication path 30. Also, the concealer 194 decrypts data received from the communication path 30, and sends the decrypted data to the flow data receiver 192. Any method of encryption communication may be used by the concealer 194.

Next, the linking data processing to be executed by the data processing device 10 is described with reference to FIG. 8 to FIG. 17. The linking data processing is processing in which the data processing device 10 links with the data processing device 20, and executes the processing flow. The linking data processing starts by execution of a program by the data processing device 10.

Figure 8:
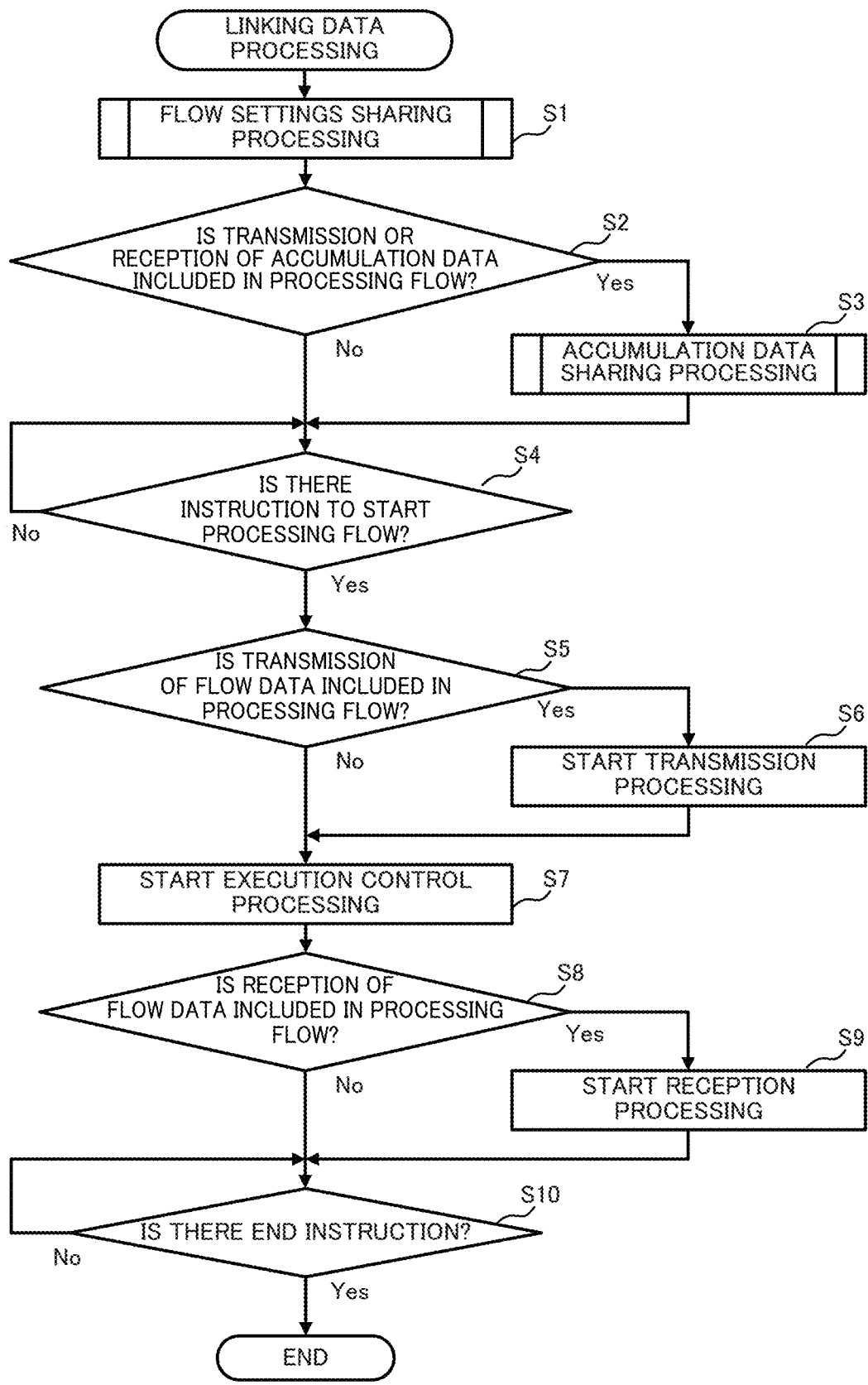
FIG. 8 is a flowchart illustrating a linking data processing according to the embodiment.
Figure 9:
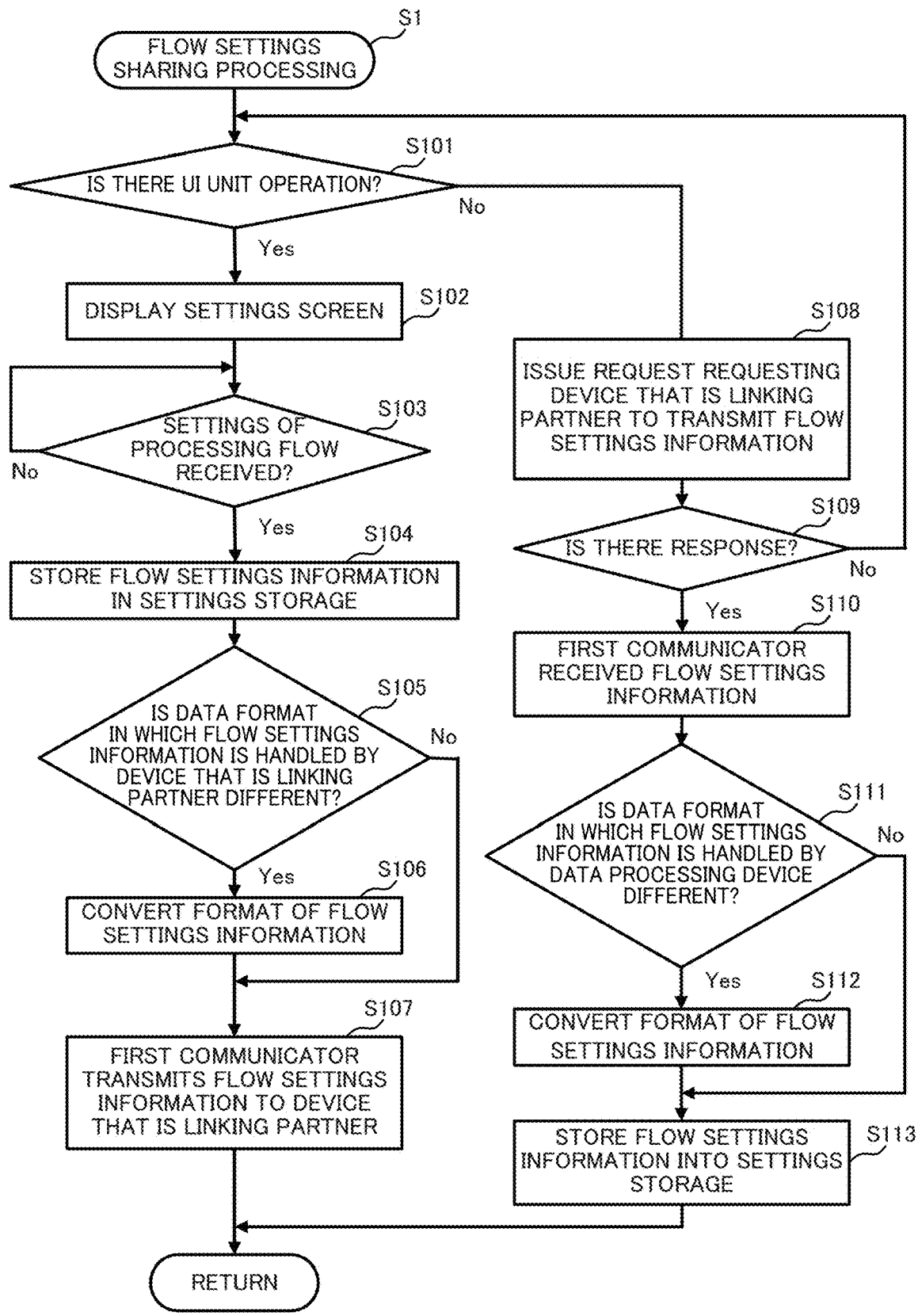
FIG. 9 is a flowchart illustrating flow setting sharing processing according to the embodiment.

As illustrated in FIG. 8, in the linking data processing, the data processing device 10 executes flow settings sharing processing (step S1). The flow settings sharing processing is processing in which the data processing devices 10 and 20 share flow settings information. This flow settings sharing processing corresponds to the first communication step in the Claims. Next, the flow settings sharing processing is described with reference to FIG. 9.

In the flow settings sharing processing, the accepter 120 makes a determination as to whether or not there is an operation of the UI unit 110 (step S101). Specifically, the accepter 120 makes a determination as to whether or not an operation for starting the setting of the processing flow is inputted in the UI unit 110. This operation is, for example, an execution of a predetermined command or a selection of an object displayed on the screen of the UI unit 110.

In a case where a determination is made that there is an operation of the UI unit 110 (YES in step S101), the UI unit 110 displays a settings screen in accordance with an instruction of the accepter 120 (step S102). This settings screen is a screen for inputting detailed settings of the processing flow.

Next, the accepter 120 makes a determination as to whether or not a setting of the processing flow is accepted (step S103). Specifically, after inputting of the processing flow on the settings screen displayed in step S102 is complete, the accepter 120 makes a determination as to whether or not a notification indicating the inputted settings details of the processing flow was provided by the UI unit 110 unit.

If a determination is made that a setting of the processing flow is not accepted (NO in step S103), the accepter 120 stands-by repeatedly performing the determination of step S103 until a setting of the processing flow is accepted. Conversely, if a determination is made that a setting of the processing flow is accepted (YES in step S103), the accepter 120 sends flow settings information indicating the setting of the processing flow to the execution controller 140 and the execution controller 140 stores the flow settings information into the settings storage 151 (step S104).

Next, the settings information converter 181 makes a determination as to whether or not the data format in which the flow settings information is handled by the data processing device 20 that is the linking partner is different from the data format of the flow settings information stored in the settings storage 151 in step S104 (step S105).

If a determination is made that the data formats are not different (NO in step S105), the processing by the data processing device 10 moves to step S107. Conversely, if a determination is made that the data formats are different (YES in step S105), the settings information converter 181 converts the data format of the flow settings information read from the settings storage 151 into a data format corresponding to the data processing device 20 (step S106).

Next, the first communicator 180 transmits the flow settings information to the data processing device 20 that is the linking partner (step S107). Specifically, the distributor 183 acquires the flow settings information outputted from the settings information converter 181, and transmits the acquired flow settings information to the data processing device 20 via the concealer 184. By doing so, the data processing device 20 holds information that is substantially the same as the flow settings information held by the data processing device 10. After doing so, the processing by the data processing device 10 returns from the flow settings sharing processing to the linking data processing of FIG. 8.

In step S101, if a determination is made that there is no operation of the UI unit 110 (NO in step S101), the first communicator 180 issue a request requesting the data processing device 20 that is the linking partner to transmit the flow settings information (step S108). Specifically, the distributor 183 generates data instructing transmission of the flow settings information, and sends the generated data to the data processing device 20 via the concealer 184.

Next, the first communicator 180 makes a determination as to whether or not there is a response from the data processing device 20 with respect to the request of step S108 (step S109). If a determination is made that there is no response (NO in step S109), the processing of step S101 and subsequent steps are repeated. Conversely, if a determination is made that there is a response (YES in step S109), the first communicator 180 receives the flow settings information (step S110). Specifically, the distributor 183 receives, via the concealer 184, the flow settings information included in the response determined as existing in step S109.

Next, the settings information converter 181 makes a determination as to whether or not the data format in which the flow settings information is handled by the data processing device 10 is different from the data format of the flow settings information received in step S110 (step S111).

If a determination is made that the data formats are not different (NO in step S111), the processing by the data processing device 10 moves to step S113. Conversely, if a determination is made that the data formats are different (YES in step S111), the settings information converter 181 converts the data format of the flow settings information received in step S110 into a data format corresponding to the execution controller 140 (step S112).

Next, the settings information converter 181 stores the flow settings information into the settings storage 151 (step S113). By doing so, the data processing device 10 can acquire and share the flow settings information pre-set in the data processing device 20. After doing so, the processing by the data processing device 10 returns from the flow settings sharing processing to the linking data processing of FIG. 8.

Referring back to FIG. 8, after the flow settings sharing processing of step S1, the data processing device 10 makes a determination as to whether or not the transmission or reception of accumulation data is included in the processing flow (step S2). Specifically, the execution controller 140 references the flow settings information shared in step S1, and makes a determination as to whether or not partial processing in which one of the data processing devices 10 and 20 reads the accumulation data accumulated in the other one of the data processing devices 10 and 20 is included in the processing flow.

Figure 10:
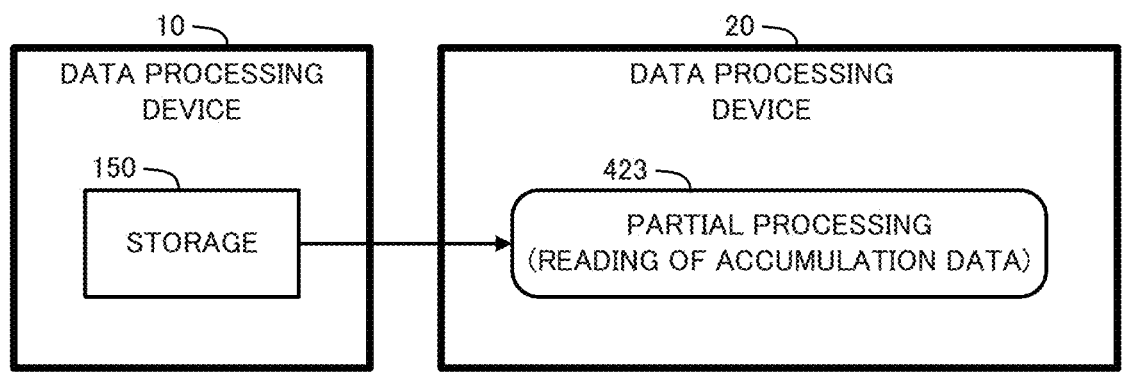
FIG. 10 is a diagram schematically illustrating an example in which accumulation data is transmitted according to the embodiment.
Figure 11:
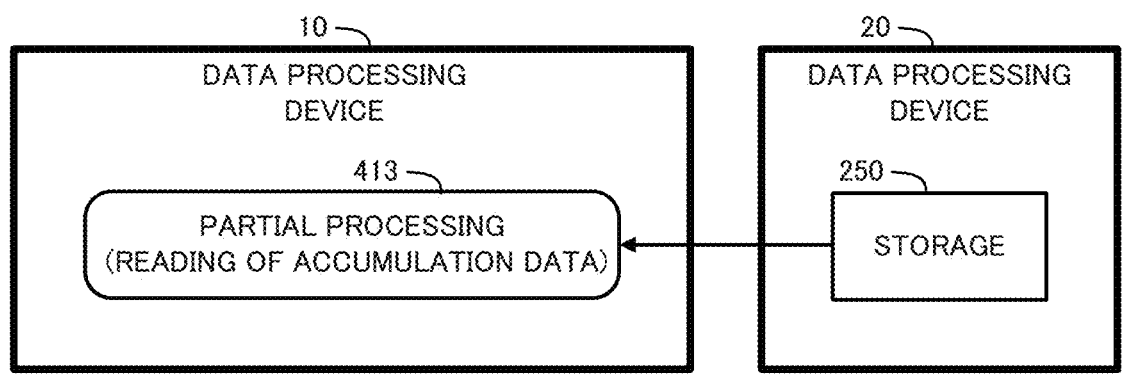
FIG. 11 is a diagram schematically illustrating an example in which accumulation data is received according to the embodiment.
Figure 12:
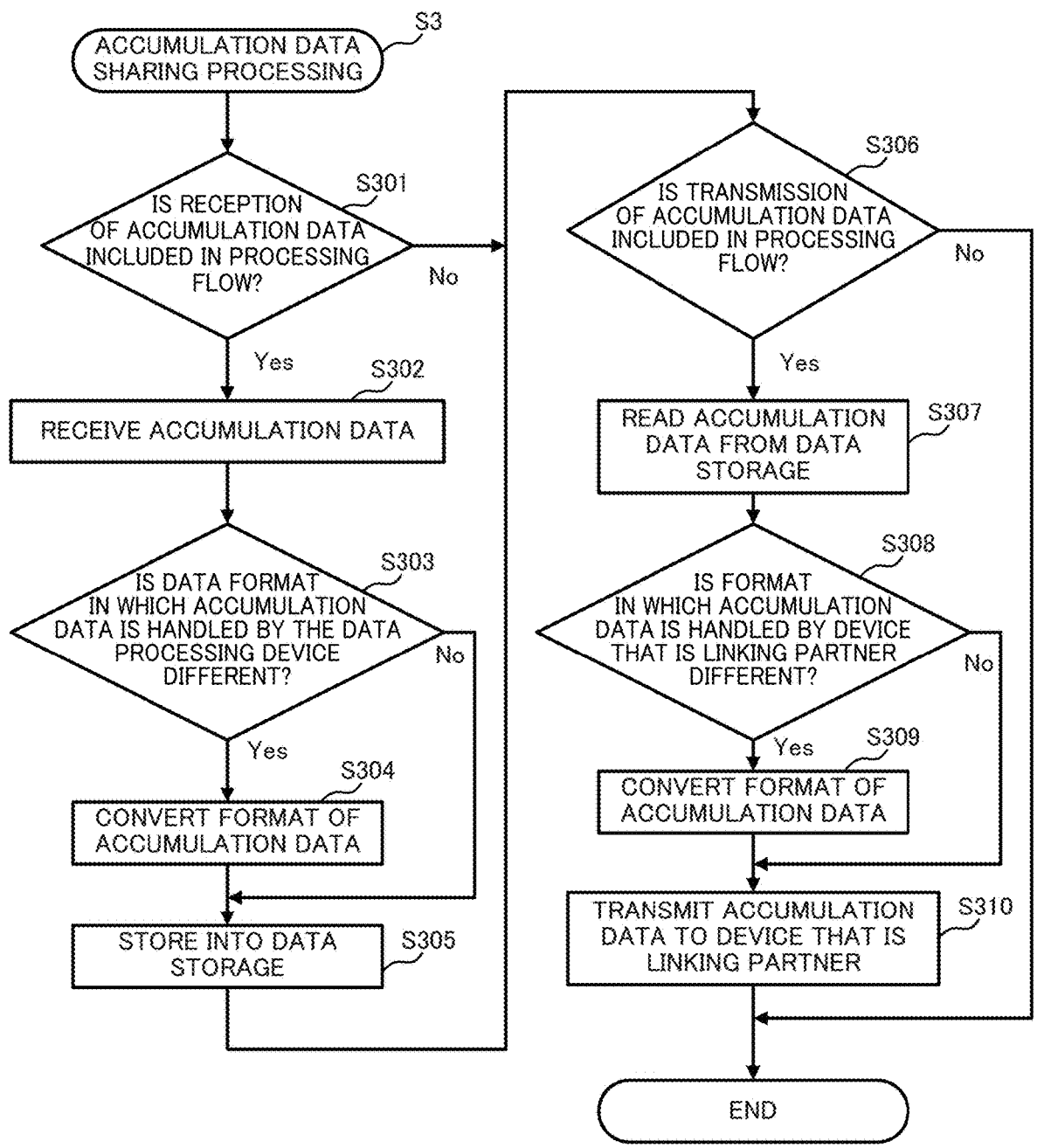
FIG. 12 is a flowchart illustrating accumulation data sharing processing according to the embodiment.
Figure 13:
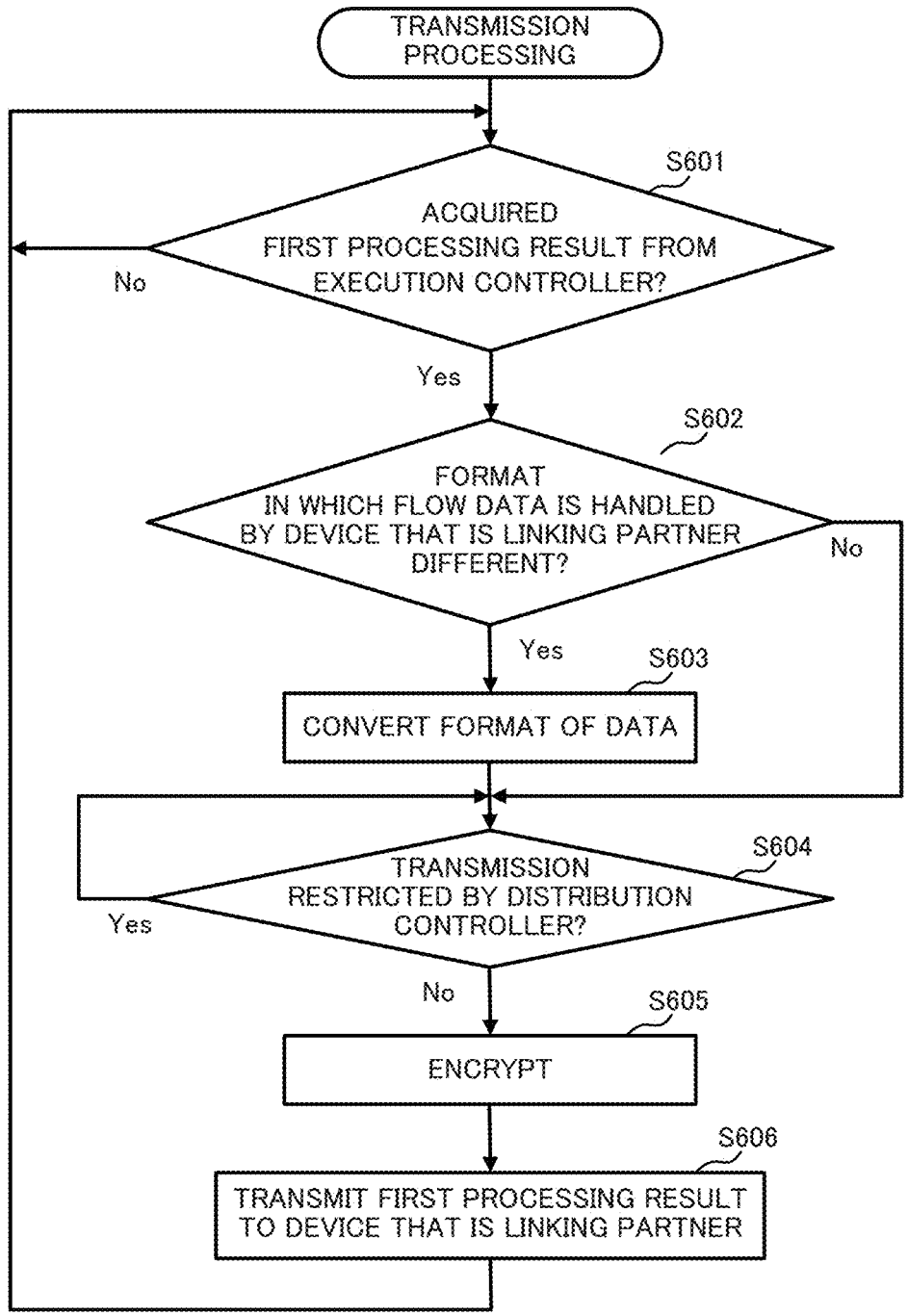
FIG. 13 is a flowchart illustrating transmission processing according to the embodiment.
Figure 14:
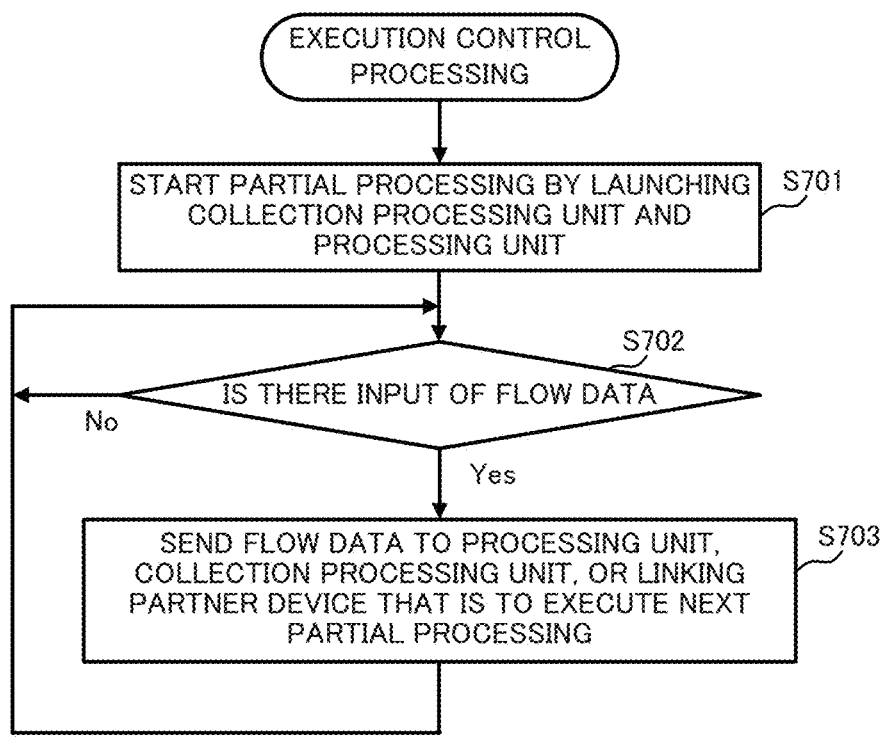
FIG. 14 is a flowchart illustrating execution control processing according to the embodiment.

FIG. 10 schematically illustrates partial processing in which the data processing device 20 reads accumulation data accumulated by the data processing device 10. In the example illustrated in FIG. 10, the data processing device 10 transmits the accumulation data to the data processing device 20. FIG. 11 schematically illustrates partial processing in which the data processing device 10 reads the accumulation data accumulated in the data processing device 20. In the example illustrated in FIG. 11, the data processing device 10 receives the accumulation data from the data processing device 20.

Referring back to FIG. 8, if a determination is made that the transmission or reception of accumulation data is included in the processing flow (YES in step S2), the data processing device 10 executes accumulation data sharing processing (step S3). This accumulation data sharing processing is processing in which accumulation data is shared by distributing accumulation data from one of the data processing devices 10 and 20 to the other one of the data processing devices 10 and 20. This accumulation data sharing processing is described with reference to FIG. 12.

In the accumulation data sharing processing, the first communicator 180 makes a determination as to whether or not the reception of accumulation data is included in the processing flow (step S301). Specifically, the distributor 183 references the flow settings information of the settings storage 151, and makes a determination as to whether or not partial processing, in which reception of accumulation of data is required, is included in the processing flow.

If a determination is made that the reception of accumulation data is not included in the processing flow (NO in step S301), the processing by the data processing device 10 moves to step S306. Conversely, if a determination is made that reception of accumulation data is included in the processing flow (YES in step S301), the first communicator 180 receives the accumulation data from the data processing device 20 (step S302). Specifically, the distributor 183 receives the accumulation data via the concealer 184 by issuing a request to the processing device 20 to transmit the accumulation data.

Next, the accumulation data converter 182 makes a determination as to whether or not the data format in which the accumulation data is handled by the data processing device 10 is different from the data format of the accumulation data received in step S302 (step S303).

If a determination is made that the data formats are not different (NO in step S303), the processing by the data processing device 10 moves to step S305. Conversely, if a determination is made that the data formats are different (YES in step S303), the accumulation data converter 182 converts the data format of the accumulation data received in step S302 to a data format corresponding to the execution controller 140 (step S304).

Next, the accumulation data converter 182 stores the accumulation data into the data storage 152 (step S305). By doing so, the sharing of the accumulation data stored in advance in the data processing device 20 is complete, and thus preparation for executing partial processing in which this accumulation data is to be read is complete.

Next, the first communicator 180 makes a determination as to whether or not the transmission of the accumulation data is included in the processing flow (step S306). Specifically, the distributor 183 references the flow settings information of the settings storage 151, and makes a determination as to whether or not the partial processing, in which transmission of the accumulation data is required, is included in the processing flow.

If a determination is made that transmission of the accumulation data is not included in the processing flow (NO in step S306), the processing by the data processing device 10 returns from the accumulation data sharing processing to the linking data processing illustrated in FIG. 8. Conversely, if a determination is made that transmission of the accumulation data is included in the processing flow (YES in step S306), the accumulation data converter 182 reads the accumulation data from the data storage 152 (step S307).

Next, the accumulation data converter 182 makes a determination as to whether or not the format in which the accumulation data is handled by the data processing device 20 that is the linking partner is different from the format of the accumulation data read in step S307 (step S308).

If a determination is made that the data formats are not different (NO in step S308), the processing by the data processing device 10 moves to step S310. Conversely, if a determination is made that the data formats are different (YES in step S308), the accumulation data converter 182 converts the format of the accumulation data read in step S307 into a data format corresponding to the data processing device 20 (step S309).

Next, the first communicator 180 transmits the accumulation data to the data processing device 20 that is the linking partner (step S310). Specifically, the distributor 183 acquires accumulation data outputted from the accumulation data converter 182, and transmits the acquired accumulation data to the data processing device 20 via the concealer 184. By doing so, the data processing device 20 holds information that is substantially the same as the accumulation data held by the data processing device 10. After doing so, the processing by the data processing device 10 returns from the accumulation data sharing processing to the linking data processing illustrated in FIG. 8.

Referring back to FIG. 8, if a determination is made that reception or transmission of the accumulation data is not included in the processing flow in step S2 (NO in step S2) or if the accumulation data sharing processing (step S3) is complete, the data processing device 10 makes a determination as to whether or not there is an instruction to start the processing flow (step S4). Specifically, the execution controller 140 makes a determination as to whether or not there is an instruction indicating to start the processing flow in accordance with the flow settings information shared in step S1. This starting instruction may be an instruction inputted by a user, may be an instruction transmitted from the data processing device 20, or may be a trigger generated when the time becomes a designated time in a predetermined schedule.

If a determination is made that there is no start instruction (NO in step S4), the data processing device 10 stands-by repeatedly performing the determination of step S4 until there is a start instruction. Conversely, if a determination is made that there is a start instruction (YES in step S4), the execution controller 140 makes a determination as to whether or not the transmission of the flow data is included in the processing flow (step S5). Specifically, the execution controller 140 references the flow settings information of the settings storage 151, and makes a determination as to whether or not the inputting of partial processing, in which the result of the partial processing executed in the data processing device 10 is to be inputted in the partial processing to be executed by the data processing device 20, is included in the processing flow.

If a determination is made that transmission of the flow data is included in the processing flow (YES in step S5), the execution controller 140 causes the flow data transmitter 191 to start transmission processing (step S6). This transmission processing is executed in parallel to the linking data processing. This transmission processing corresponds to the second communication step in the Claims. Next, the transmission processing is described with reference to FIG. 13.

In the transmission processing, the flow data transmitter 191 makes a determination as to whether or not the first processing result, which is the result of partial processing by the processing unit 130, is acquired from the execution controller 140 (step S601). If a determination is made that the first processing result is not acquired (NO in step S601), the flow data transmitter 191 stands-by repeatedly performing the determination of step S601 until the first processing result is acquired. Conversely, if a determination is made that the first processing result is acquired (YES in step S601), the flow data transmitter 191 makes a determination as to whether or not the data format in which the flow data is handled by the data processing device 20 that is the linking partner is different from the data format of the first processing result acquired in step S601 (step S602).

If a determination is made that the data formats are not different (NO in step S602), the processing by the flow data transmitter 191 moves to step S604. Conversely, if a determination is made that the data formats are different (YES in step S602), the flow data transmitter 191 converts the data format of the first processing result acquired in step S601 to a data format corresponding to the data processing device 20 (step S603).

Next, the flow data transmitter 191 makes a determination as to whether or not transmission of the first processing result is restricted by the distribution controller 193 (step S604). If a determination is made that transmission is restricted (YES in step S604), the flow data transmitter 191 stands-by repeatedly performing the determination of step S604 until restriction of transmission is lifted. Conversely, if a determination is made that transmission is not restricted (NO in step S604), the flow data transmitter 191 sends the first processing result to the concealer 194, and the concealer 194 encrypts the first processing result (step S605).

Next, the second communicator 190 transmits, to the data processing device 20 that is the linking partner, the first processing result encrypted in step S605 (step S606). After doing so, the processing of step S601 and the subsequent steps are repeated. By doing so, the flow data sent to the second communicator 190 from the execution controller 140 is transmitted successively to the data processing device 20.

Referring back to FIG. 8, if a negative determination is made in step S5 (NO in step S5) or the processing of step S6 is complete, the data processing device 10 starts execution control processing (step S7). The execution control processing is processing in which the execution controller 140 causes data to be distributed between one of the processing units 130, one of the collection processing units 160, and the connector 170 in accordance with the flow settings information. This execution control processing is executed in parallel to the linking data processing. This execution control processing corresponds to the execution step in the Claims. Next, the execution control processing is described with reference to FIG. 14.

In the execution control processing, the execution controller 140 causes the collection processing unit 160 and the processing units 130 to launch and start partial processing (step S701). Specifically, the execution controller 140 references the flow settings information of the settings storage 151, specifies the program that realizes the collection processing unit 160 and the processing units 130 that are to execute the partial processing included in the processing flow, and launches the specified program. By doing so, the collection processing unit 160 and the processing units 130 are in a state in which partial processing can be executed.

Next, the execution controller 140 makes a determination as to whether or not there is an input of flow data (step S702). Specifically, the execution controller 140 makes a determination as to whether or not the data in accordance with the processing flow is sent from any of the processing units 130, the collection processing units 160, and the connector 170 to the execution controller 140.

Figure 15:
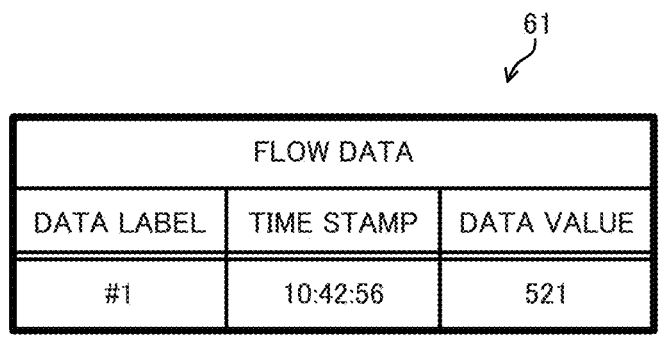
FIG. 15 is a diagram illustrating an example of flow data according to the embodiment.

FIG. 15 illustrates an example of flow data 61. The flow data 61 is a table having a data label assigned to flow data, a time stamp indicating a time at which target data corresponding to this flow data is collected, and a value of the data in association with one another. Here, the target data refers to data to which the processing flow is to be applied and is equivalent to data that is to be collected from the apparatus 31. The data label is equivalent to a label for identifying an arrow in the FIG. 2. For example, the data to be outputted from the partial processing 411 in FIG. 2 and inputted into the partial processing 412 is assigned the data label "#1". The time stamp indicates time at which the target data, to which the partial processing is to be applied in order to acquire the flow data, is collected. For example, in FIG. 2, the partial processings 411, 412, and 421 are applied sequentially to the target data collected by execution of the partial processing 411 at the time 10:42:56 (hh:mm:ss), and all of the flow data, which are outputs of these partial processings, are assigned with a time stamp of "10:42:56". The value of the data indicates the result of the partial processing.

Referring back to FIG. 14, if a determination is made that there is no input of flow data in step S702 (NO in step S702), the execution controller 140 stands-by repeatedly performing the determination of step S702 until flow data is inputted. Conversely, if a determination is made that there is an input of flow data (YES in step S702), the execution controller 140 sends the flow data determined to be inputted in step S702 to the processing unit 130, the collection processing unit 160, or the linking partner data processing device 20 that is to perform the next partial processing in accordance with the flow settings information (step S703). For example, in a case where the processing flow illustrated in FIG. 2 is to be executed, when the flow data is inputted from the collection processing unit 160 that is to execute the partial processing 411, the execution controller 140 sends this flow data to the processing unit 130 that is to execute the partial processing 412. Also, when the flow data is inputted from this processing unit 130, the execution controller 140 sends this flow data to the second communicator 190 to transmit this data to the data processing device 20 that is to execute the partial processing 421.

Referring back to FIG. 14, after step S703, the execution controller 140 repeatedly performs the processing of step S702 and the subsequent step. By doing so, the execution controller 140 can cause the processing unit 130 and the collection processing unit 160 to repeatedly execute the first partial processing that is to be executed by the data processing device 10 within the processing flow that includes a series of partial processings in accordance with the flow settings information.

Figure 16:
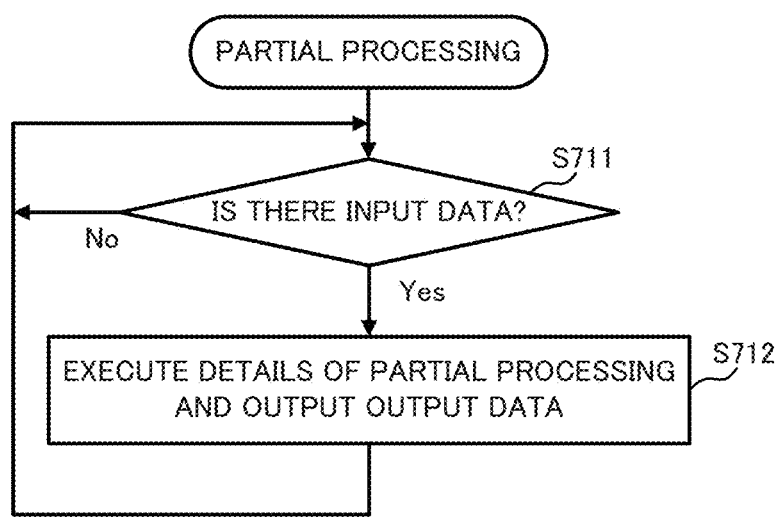
FIG. 16 is a flowchart illustrating partial processing according to the embodiment.
Figure 17:
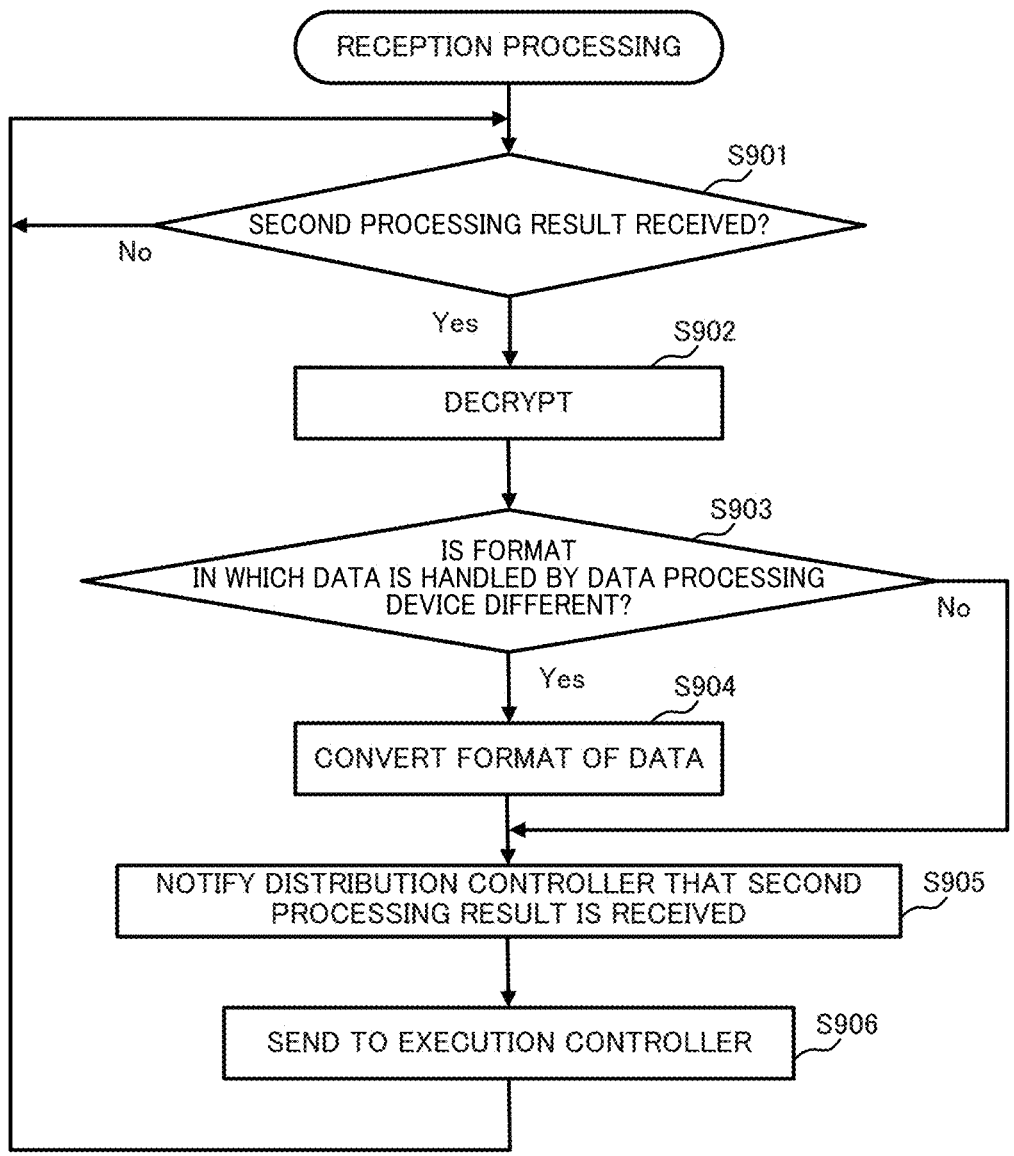
FIG. 17 is a flowchart illustrating reception processing according to the embodiment.

Next, the partial processing to be started in step S701 is described with reference to FIG. 16. This partial processing is achieved by one of the processing units 130 and one of the collection processing units 160 and this processing is executed in parallel to the execution control processing. Next, an example is given focusing mainly on the processing unit 130 executing the partial processing.

In the partial processing, the processing unit 130 makes a determination as to whether or not there is input data (step S711). Specifically, the processing unit 130 makes a determination as to whether or not data sent from the execution controller 140 is inputted. In a case where the partial processing is to be executed by the collection processing unit 160, the collection processing unit 160 makes a determination as to whether or not there is data outputted from the apparatus 31.

If a determination is made that there is no input data (NO in step S711), the processing unit 130 stands-by repeatedly performing the determination of step S711 until there is input data. Conversely, if a determination is made that there is input data (YES in step S711), the processing unit 130 executes the details of the partial processing, and outputs the output data indicating the result of the partial processing to the execution controller 140 (step S712). After doing so, the processing unit 130 repeats the processing of step S711 and the subsequent step.

Referring back to FIG. 8, after step S7, the execution controller 140 makes a determination as to whether or not reception of flow data is included in the processing flow (step S8). Specifically, the execution controller 140 references the flow settings information of the settings storage 151 and makes a determination as to whether or not the inputting of partial processing, in which the result of the second partial processing executed in the data processing device 20 is to be inputted in the first partial processing to be executed in the data processing device 10, is included in the processing flow.

If a determination is made that the reception of flow data is included in the processing flow (YES in step S8), the execution controller 140 causes the flow data receiver 192 to start reception processing (step S9). This reception processing is executed in a parallel to the linking data processing. This reception processing corresponds to the second communication step in the Claims. Next, the reception processing is described with reference to FIG. 17.

In the reception processing, the second communicator 190 makes a determination as to whether or not the second processing result that is to serve as the target of the first partial processing to be executed by the data processing device 10 is received from the data processing device 20 (step S901). If a determination is made that the second processing result is not received (NO in step S901), the second communicator 190 stands-by repeating the determination of step S901 until the second processing result is received. Conversely, if a determination is made that the second processing result is received (YES in step S901), the concealer 194 decrypts the second processing result (step S902).

Next, the flow data receiver 192 makes a determination as to whether or not the data format in which the flow data is handled by the data processing device 10 is different from the data format of the second processing result received in step S901 (step S903).

If a determination is made that the data formats are not different (NO in step S903), the processing by the flow data receiver 192 moves to step S905. Conversely, if a determination is made that the data formats are different (YES in step S903), the flow data receiver 192 converts the data format of the second processing result received in step S901 to a data format corresponding to the execution controller 140 (step S904).

Next, the flow data receiver 192 notifies the distribution controller 193 that the second processing result is received (step S905). By doing so, the distribution controller 193 can estimate the degree of congestion of the communication path 30.

Next, the flow data receiver 192 sends the second processing result to the execution controller 140 (step S906). After doing so, the processing of step S901 and the subsequent steps are performed. By doing so, the second processing result distributed from the data processing device 20 to the second communicator 190 is successively inputted into the execution controller 140.

Referring back to FIG. 8, if a determination is made that the reception of flow data in step S8 is not included in the processing flow (NO in step S8) or if processing of the step S9 is complete, the data processing device 10 makes a determination as to whether or not there is an end instruction to end the processing flow (step S10). This end instruction may be an instruction inputted by a user, may be an instruction transmitted from the data processing device 20, or may be a trigger generated when the time becomes a designated time in a predetermined schedule.

If a determination is made that there is no end instruction (NO in step S10), the data processing device 10 stands-by repeating the determination of step S10 until there is an end instruction. Conversely, if there is an end instruction (YES in step S10), the data processing device 10 ends the linking data processing. Specifically, the data processing device 10 ends the transmission processing started in step S6, the execution control processing started in step S7, the partial processing started by this execution control processing, and the reception processing started in step S9.

As described above, the data processing device includes the first communication means for communicating to share with another data processing device the flow settings information for executing the processing flow, and the execution control means for causing the processing means to execute the partial processing in accordance with the flow settings information. Therefore, the partial processings in the processing flow can be executed by multiple data processing devices 10 and 20. That is, multiple devices can be linked together to execute the processing flow.

According to the data processing device 10, execution controller 140 causes one of the processing units 130 and one of the collection processing units 160 to execute the first partial processing that is to be executed by the data processing device 10 in accordance with the flow settings information, and the second communicator executes reception of the second processing result that is to serve as the target of the first partial processing from the data processing device 20 and sending of the second processing result to the execution controller 140, and executes acquisition of the first processing result from the execution controller 140 and transmission of the first processing result to the data processing device 20. Therefore, the first partial processing to be executed by the data processing device 10 and the second partial processing to be executed by the data processing device 20 can be executed continuously via communication by the second communicator 190. By doing so, the data processing devices 10 and 20 can be linked to together to execute the processing flow.

Therefore, the processing flow can be designed with a higher degree of freedom. For example, in a case where the data processing devices 10 and 20 are to be installed in locations different from each other, these data processing devices 10 and 20 can be utilized to design a processing flow in which the partial processings of these devices are connected. Also, although the data processing devices 10 and 20 have substantially the same configurations, there are cases in which the hardware performances are different and the configurations of the software corresponding to the processing unit 130 are different. Therefore, it is conceivable that there is a partial processing in which execution is suitable on one of the processing devices 10 and 20. Even when there is such kind of partial processing, a processing flow in which a partial processing suitable for execution by one of the data processing devices 10 and 20 and a partial processing suitable for execution by the other one of the data processing devices 10 and 20 are combined can be designed.

Also, the flow settings information is information indicating settings of the processing flow including partial processing to be executed by the respective data processing devices 10 and 20. The processing flow includes a series of partial processings that are to be applied to target data that is to be processed. The first communicator 180 performed communication to share the flow settings information with the data processing device 20. By doing so, the flow settings information is shared between the data processing devices 10 and 20, thereby enabling the processing flow to be repeated and executed smoothly.

Also, the execution controller 140 caused one of the processing units 130 and one of the collection processing units 160 to execute the first partial processing that is to be executed by the data processing device 10 in accordance with the flow settings information. By doing so, the execution controller 140 relays the input and output data of the partial processing, thereby functioning as an interface of the processing unit 130 and the collection processing unit 160. Therefore, it is easy to design the processing unit 130 and the collection processing unit 160. That is, the user can easily set the processing flow as desired.

Also, the accepter 120 accepted the settings of the processing flow, the settings storage 151 stored the flow settings information indicating the settings accepted by the accepter 120, and the first communicator 180 transmitted flow settings information stored in the settings storage 151 to the data processing device 20. By doing so, the settings of the processing flow inputted in the data processing device 10 can be shared with the data processing device 20.

Also, in the case where the settings of the processing flow are not accepted by the accepter 120, the first communicator 180 received the flow settings information from the data processing device 20, the settings storage 151 stored the flow settings information received by the first communicator 180, and the execution controller 140 caused one of the processing units 130 and one of the collection processing units 160 to execute the first partial processing in accordance with the flow settings information stored in the settings storage 151. By doing so, the data processing device 10 can share the flow settings information indicating the settings of this processing flow with the data processing device 20 even in the case where the user inputted the settings of the processing flow into the data processing device 20.

Also, the first partial processing to be executed by the processing unit 130 and the collection processing unit 160 includes the collecting of target data to be outputted by the apparatus 31. The second communicator 190 acquired from the execution controller 140 the first processing result which is the result of the first processing by the processing unit 130 and the collection processing unit 160, and transmitted the acquired first processing result to the data processing device 20. By doing so, the first partial processing to be applied to the target data collected by the data processing device 10 and the second partial processing to be executed by the data processing device 20 are connected, thereby enabling the first partial processing and the second partial processing to be executed in succession.

Also, the second communicator 190 received the second processing result from the data processing device 20, and sent the received second processing result to the execution controller 140. The execution controller 140 caused one of the processing units 130 and one of the collection processing units 160 to execute the first partial processing in accordance with the flow settings information in response to the second processing result. Also, the first partial processing to be executed by the processing unit 130 and the collection procession 160 included the outputting of the output information indicating the result of this first partial processing to outside of the data processing device 10. Therefore, the data processing device 10 can also output the result of applying the first partial processing in response to the data indicating the result of the second partial processing by the data processing device 20.

Also, the first communicator 180 converted the data format of the flow settings information to a data format corresponding to the data processing device 20, and transmitted the flow settings information in the converted data format to the data processing device 20. By doing so, the flow settings information can be shared even when the data formats in which the flow settings information is handled by the data processing devices 10 and 20 are different.

Also, the second communicator 190 received the second processing result, converted the data format of the second processing result into a data format corresponding to the execution controller 140, and sent the second processing result in the converted data format to the execution controller 140. By doing so, the flow data can be transmitted and the processing flow can be executed even when the data formats in which flow data handled by the data processing devices 10 and 20 are different.

Also, the first communicator 180 includes the concealer 184 that achieves the encryption communication for sharing the flow settings information with the data processing device 20. Also, the second communicator 190 includes the concealer 194 that is substantially the same as the concealer 184. The second communicator 190 executed reception of the second processing result from the data processing device 20, decryption of the received second processing result, and sending of the decrypted second processing result to the execution controller 140, and executed acquisition of the first processing result from the 140, encryption of the acquired first processing result, and transmission of the encrypted first processing result to the data processing device 20. By doing so, the communication details on the communication path 30 can be prevented from being leaked, obtained by wiretap, or tampered with.

Also, the processing flow includes the first partial processing with respect to the accumulation data accumulated in the data processing device 20. The first communicator 180 received the accumulation data, converted the data format into a data format corresponding to the execution controller 140, and stored the accumulation data in the converted data format into the data storage 152. Also, the execution controller 140 caused one of the processing units 130 and one of the collection processing units 160 to execute the first partial processing in accordance with the flow settings information in response to the accumulation data stored in the data storage 152. By doing so, the processing flow can be executed with the accumulation data of the data processing device 20 as the target of the first partial processing by the data processing device 10.

Although the foregoing describes an embodiment of the present disclosure, the embodiment of the present disclosure is to be regarded in an illustrative sense rather than a restrictive sense.

Figure 18:
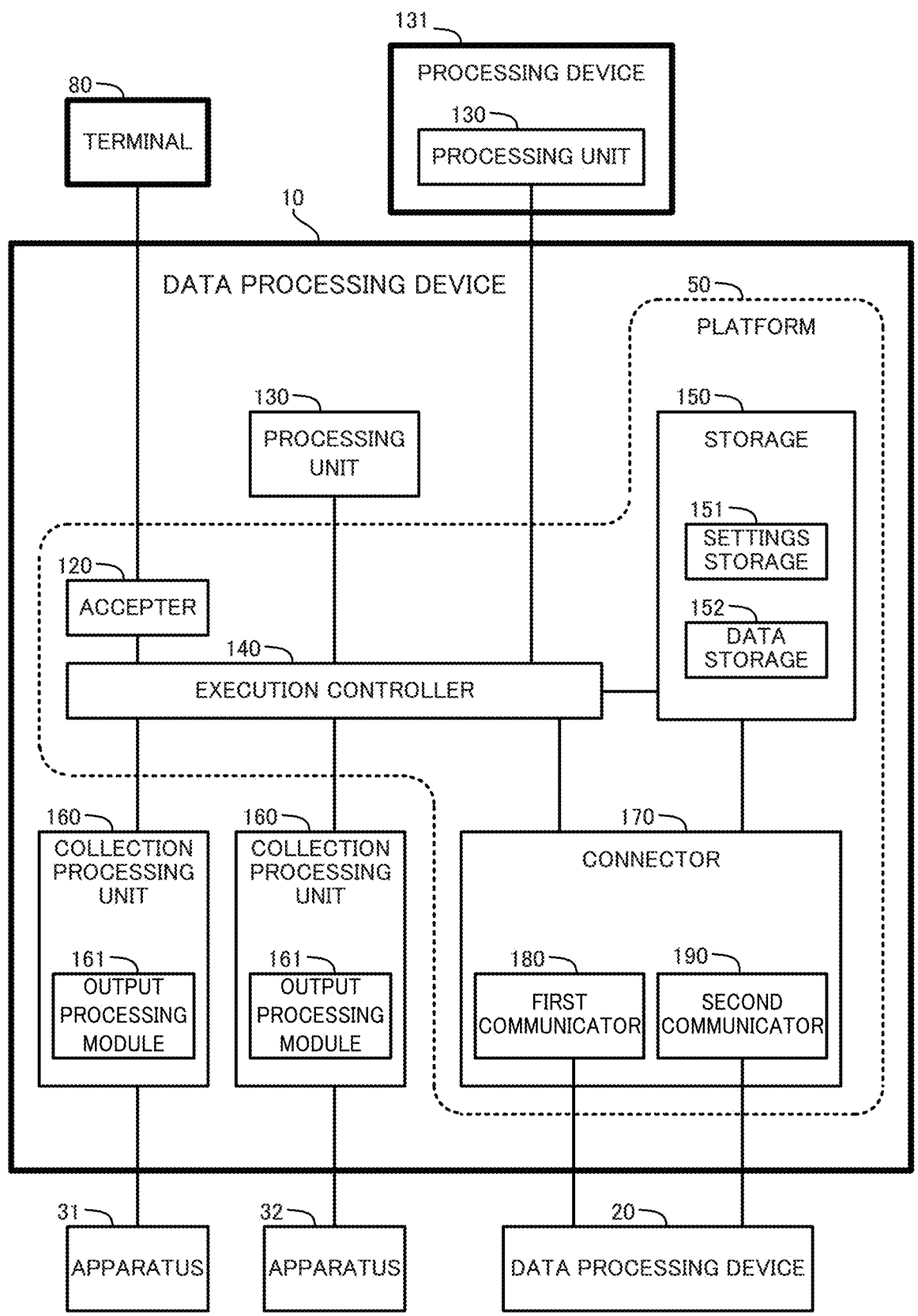
FIG. 18 is a diagram illustrating a configuration of a data processing device according to a modified example of the embodiment.

For example, the platform 50 is provided as an operation environment for executing the processing flow. Therefore, as illustrated in FIG. 18, the processing flow can be executed even when an external terminal 80, in place of the UI unit 110, is to be connected to the platform 50, and a processing device 131 having a portion of the processing units 130 or all of the processing units 130 is connected to the platform 50.

Furthermore, the platform 50 may be provided as an operation environment for independently executing the processing flow without the data processing device 10 linking with the data processing device 20 in accordance with the settings of the processing flow.

Also, in the aforementioned embodiment, although an example is described in which users input settings of the processing flow both of the data processing devices 10 and 20, this is not limiting. For example, one of the data processing devices 10 and 20 may be designated as a device for inputting the settings of the processing flow. In a case where the settings of the processing flow are to be inputted into the data processing device 10, the configuration in the data processing device 10 for receiving the flow settings information from the data processing device 20 may be omitted. Likewise, in a case where the settings of the processing flow are to be inputted into the data processing device 20, the configuration in the data processing device 10 for transmitting the flow settings information to the data processing device 20 may be omitted. It is sufficient as long as the data processing device 10 can execute at least one of transmitting or receiving the flow settings information.

In the aforementioned embodiment, although an example is described in which the data processing device 10 is capable of transmitting and receiving flow data, this is not limiting. In a case where the data processing device 10 is a device dedicated to receiving flow data, the configuration for transmitting flow data may be omitted. Likewise, in a case where the data processing device 10 is a device dedicated to transmitting flow data, the configuration for receiving flow data may be omitted. The data processing device 10 may execute both the transmitting and the receiving of the flow data. For example, the data processing device 10 may execute only the partial processing 412 within the processing flow illustrated in FIG. 2. It is sufficient as long as the data processing device 10 can execute at least one of the transmitting and the receiving of the flow data.

Also, the partial processings to be included in the processing flow are combined as desired by the user. For example, the processing flow 40 illustrated in FIG. 2 may be changed such that the first partial processing includes the partial processings 411 and 422 and the second partial processing 42 includes the partial processings 412 and 421. Also, the details of the partial processing may be set as desired by the user. For example, the data processing device 10 may execute the first partial processing 41 including the collection of data and first computing, and then the data processing device 20 may execute the second partial processing 42 including second computing and diagnosis. Here, the first computing and the second computing may be different processings or may be the same processing. That is, the partial processings that are substantially the same may be executed on different devices.

Also, in a case where the data format in which data is handled by the data processing devices 10 and 20 is the same or in a case where the data processing devices 10 and 20 are compatible with these data formats, the settings information converter 181 may be omitted and the accumulation data converter 182 may be omitted.

Also, in a case where the communication path 30 is a dedicated line, the concealers 184 and 194 may be omitted. Also, although the concealer 184 of the first communicator 180 and the concealer 194 of the second communicator 190 are described as separate configurations in order to facilitate understanding, a single concealer may encrypt external communication by the first communicator 180 and the second communicator 190.

Also, in a case where the communication speed of the communication path 30 is greater than the data amount that occurs due to the transmission and reception of the flow data, the distribution controller 193 may be omitted.

Also, in the above embodiment, although a case is described in which two data processing devices 10 and 20 are linked to execute the processing flow, three or more devices may be linked to execute the processing flow.

Figure 19:
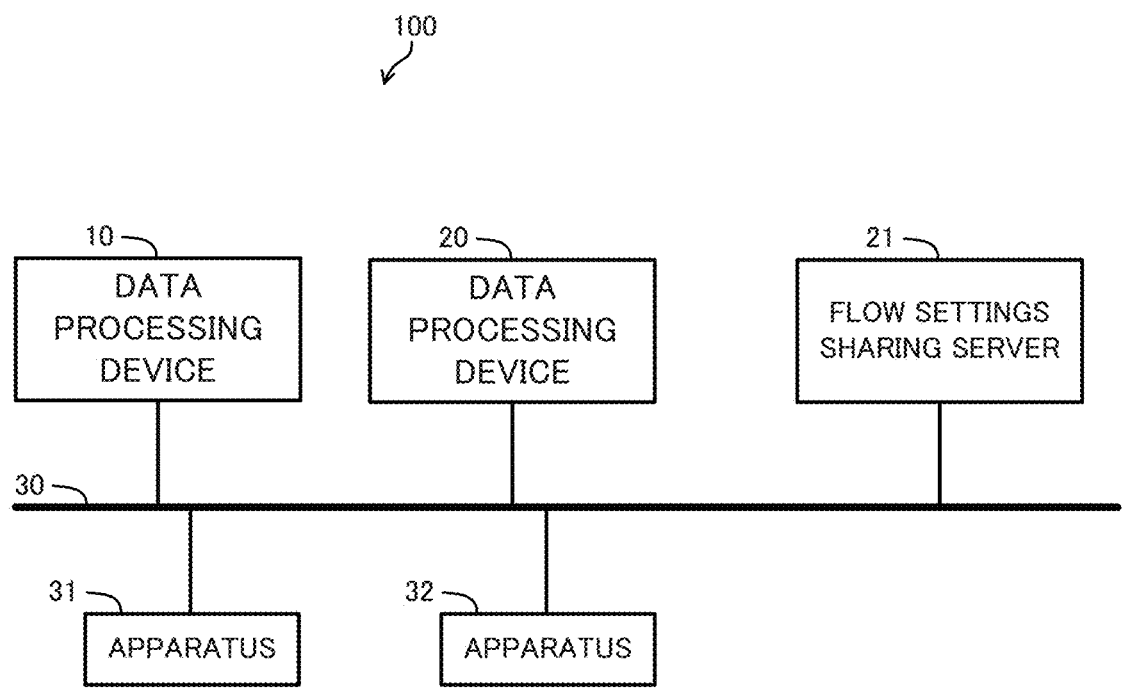
FIG. 19 is a diagram illustrating a configuration of a data processing system according to a modified example of the embodiment.

Also, a communication partner for which the data processing device 10 shares flow settings information and a communication partner for transmitting and receiving flow data may be different. For example, as illustrated in FIG. 19, a flow settings sharing server 21 that distributes flow settings information to the data processing devices 10 and 20 may be connected to the communication path 30, and the data processing device 10 may share the flow settings information with the data processing device 20 by communicating with the flow settings sharing server 21.

Figure 20:
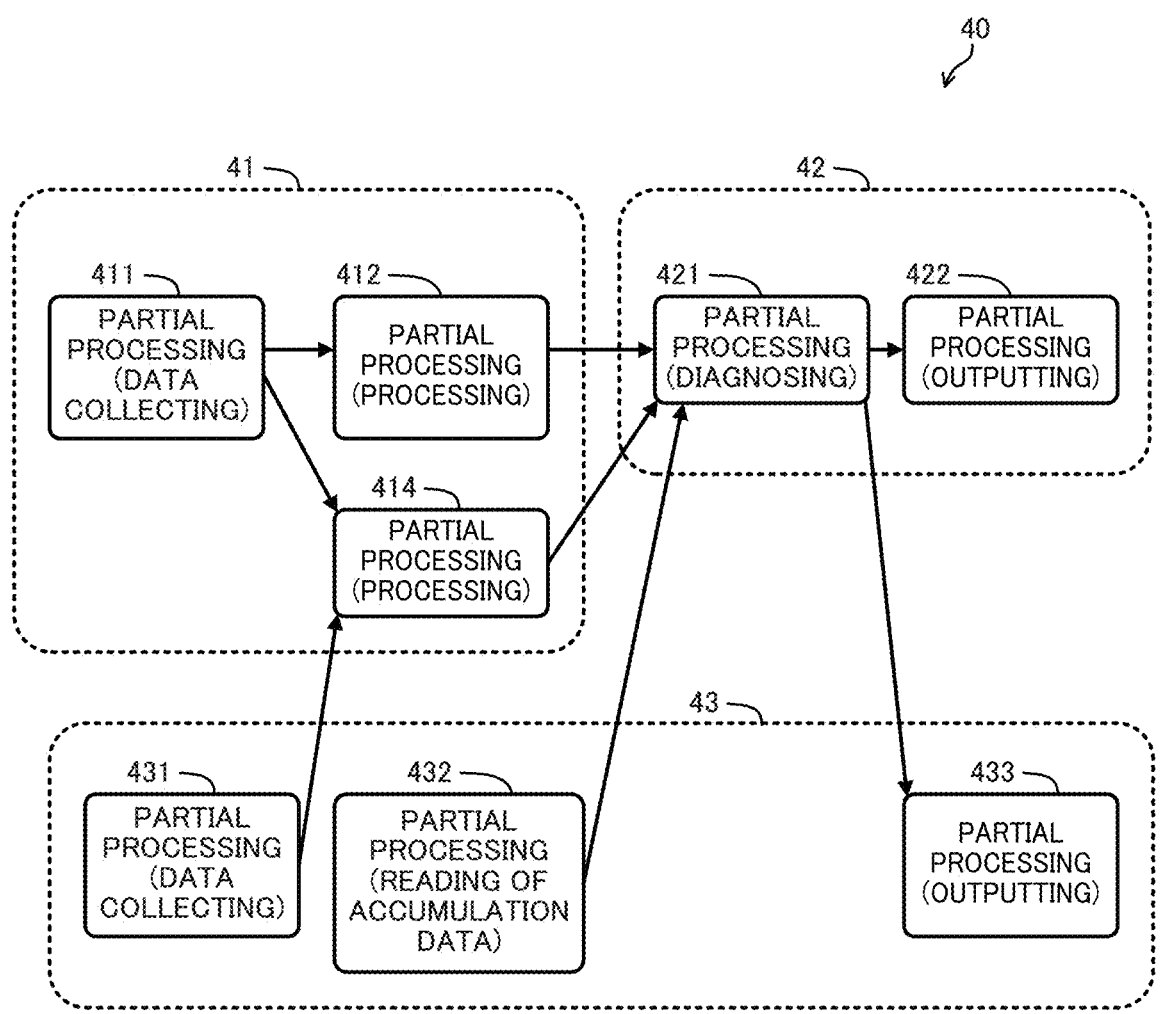
FIG. 20 is a diagram illustrating a processing flow according to a modified example of the embodiment.

Also, in the above embodiment, although an example of a simplified processing flow illustrated in FIG. 2 is given to facilitate understanding, this processing flow is not limiting. FIG. 20 illustrates another example of the processing flow 40. The processing flow 40 of FIG. 20 includes the first partial processing 41 to be executed by the data processing device 10, the second partial processing 42 to be executed by the data processing device 20, and a third partial processing 43 to be executed by another device. The first partial processing 41 includes partial processings 411, 412, and 414 as element processings, the second partial processing 42 includes partial processings 421 and 422 as element processings, and the third partial processing 43 includes partial processing 431, 432, and 433 as element processings. This processing flow 40 includes an aggregating portion in which the outputs of the partial processings 411 and 431 serves as the input of the partial processing 414 and a branching portion in which the outputs of the partial processing 421 are inputted into the partial processings 422 and 433.

Also, the processing flow may include partial processings to be executed by more than three data processing devices. Also, the data processing device and the platform are not necessarily in one-to-one correspondence. For example, a single data processing device may include multiple platforms.

Also, in the above embodiment, although the collection processing unit 160 includes the output processing module 161, this is not limiting. A unit that outputs output information may be provided as a configuration different from that of the collection processing unit 160.

Also, in the above embodiment, the target data that is the target of the processing flow is data that is received by being outputted from the apparatus 31, this is not limiting. For example, the target data output from the apparatus 31 may be stored in a storage device, and a partial processing in which the target data is regularly read from this storage device may serve as the starting point of the processing flow.

The data processing device 10 may have a configuration in which the settings storage 151 and the data storage 152 are omitted, and the execution controller 140 may read flow settings information and accumulation data stored in an external server device.

Also, in the above embodiment, the execution controller 140 is described as causing one of the processing units 130 and one of the collection processing units 160 to execute partial processings in order in accordance with the flow settings information. This description is in regard to data acquired by the collection processing unit 160 from an apparatus at a particular timing, yet is not in regard to data acquired repeatedly. Specifically, the execution order of the partial processings by the processing unit 130 regarding data acquired at different timings is not always in the order specified in the processing flow. For example, in a case where the collection processing unit 160 acquires data D1 at time t1 and acquires data D2 at time t2, and the processing and diagnostics are to be applied to these data D1 and D2, processing may be performed in order of (i) processing of the data D1, (ii) diagnosing regarding the result of the processing of the data D1, (iii) processing of the data D2, and (iv) diagnosing regarding the result of the processing of the data D2. Processing may be executed in order of (i) processing the data D1, (ii) processing the data D2, (iii) diagnosing with respect to the processing result of the data D1, and (iv) diagnosing with respect to the processing result of the data D2.

Also, the functions of the data processing device 10 can be realized by dedicated hardware or by a general-purpose computer system.

For example, a device that is to execute the aforementioned processing can be configured by storing and distributing the program P1, to be executed by the processor 11, on a non-transitory computer-readable recording medium, and reading and installing the program P1 on the device. Examples of the recording medium include a flexible disk, a compact disc read-only memory (CD-ROM), a digital versatile disc (DVD), and a magneto-optical disc (MO).

Also, the program P1 may be stored in a disc device included in a service device on a communication network such as the Internet and for example may be superimposed on carrier waves, and then downloaded to a computer.

Also, the aforementioned processing can be achieved by transferring the program P1 via a communication network while launching the program P1.

Furthermore, the aforementioned processing can be achieved by executing a portion or all of the program P1 on the server device and by executing, using the computer, a program while transmitting or receiving information regarding the processing via the communication network.

In a case where the above-described functions are achieved by an operating system (OS) by allotment to the OS or are achieved by cooperation between the OS and an application, for example, storage and distribution on the medium of only portions of the program P1 other than a portion of the program P1 executed by the OS is permissible. Alternatively, such portions of the program P1 may be downloaded to a computer.

Also, means for achieving the functions of the data processing device 10 are not limited to software. A portion or all of the functions may be achieved by dedicated hardware including a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for executing a processing flow in which partial processings are combined.

REFERENCE SIGNS LIST

10 Data processing device
11 Processor
12 Main storage
13 Secondary storage
14 Inputter
15 Outputter
16 Communicator
17 Internal bus
100 Data processing system
110 UI unit
120 Accepter
130 Processing unit
131 Processing device
140 Execution controller
150 Storage
151 Settings storage
152 Data storage
160 Collection processing unit
161 Output processing module
170 Connector
180 First communicator
181 Settings information converter
182 Accumulation data converter
183 Distributor
184, 194 Concealer
190 Second communicator
191 Flow data transmitter
192 Flow data receiver
193 Distribution controller
1511, 1512 Flow settings information
20 Data processing device
21 Flow settings sharing server
30 Communication path
31, 32 Apparatus
40 Processing flow
41 First partial processing
42 Second partial processing
43 Third partial processing
411, 412, 414, 421, 422, 431, 433 Partial processing
50 Platform
61 Flow data
80 Terminal
P1 Program

The invention claimed is:

1. A data processing device to be connected to another data processing device, the data processing device comprising:
an accepter to accept settings of a processing flow including a first partial processing and a second partial processing;
a settings storage to store therein flow settings information indicating the settings accepted by the accepter;
a first communicator to transmit to the another data processing device the flow settings information stored in the settings storage to share with the another data processing device the flow settings information;
an execution controller to cause a processing unit to execute the first partial processing in accordance with the flow settings information; and
a second communicator to execute at least one of transmission of a first processing result obtained by execution of the first partial processing to the another data processing device or reception of a second processing result obtained by execution of the second partial processing by the another data processing device.

2. The data processing device according to claim 1, wherein the second communicator transmits the first processing result to the another data processing device.

3. The data processing device according to claim 1, wherein
the first partial processing includes collecting data to be outputted from an apparatus, and
the second communicator acquires the first processing result from the execution controller, and transmits the acquired first processing result to the another data processing device.

4. The data processing device according to claim 1, wherein
the second communicator receives the second processing result from the another data processing device, and sends the received second processing result to the execution controller, the execution controller causes the processing unit to execute the first partial processing in accordance with the flow settings information in response to the second processing result, and the first partial processing to be executed by the processing unit includes outputting to outside of the data processing device the first processing result indicating a result of the first partial processing.

5. The data processing device according to claim 1, wherein the first communicator converts a format of the flow settings information into a format corresponding to the another data processing device, and transmits the flow settings information in the converted format to the another data processing device.

6. The data processing device according to claim 1, wherein the second communicator receives the second processing result, converts a format of the received second processing result to a format corresponding to the execution controller, and sends the second processing result in the converted format to the execution controller.

7. The data processing device according to claim 1, wherein the first communicator performs encrypted communication for sharing the flow settings information with the another data processing device.

8. The data processing device according to claim 1, wherein the second communicator executes at least one of (i) reception of the second processing result from the another data processing device, decryption of the received second processing result, and sending of the decrypted second processing result to the execution controller or (ii) acquisition of the first processing result from the execution controller, encryption of the acquired first processing result, and transmission of the encrypted first processing result to the another data processing device.

9. A data processing device to be connected to another data processing device, the data processing device comprising:
a first communicator for sharing with the another data processing device flow settings information for executing a first partial processing and a second partial processing that are included in a processing flow;
an execution controller to cause a processing unit to execute the first partial processing in accordance with the flow settings information; and
a second communicator to execute at least one of transmission of a first processing result obtained by execution of the first partial processing to the another data processing device or reception of a second processing result obtained by execution of the second partial processing by the another data processing device, wherein
the processing flow includes the first partial processing to be executed in response to accumulation data accumulated in the another data processing device,
the first communicator receives the accumulation data, converts a format of the accumulation data into a format corresponding to the execution controller, and stores the accumulation data in the converted format into data storage, and
the execution controller causes the processing unit to execute the first partial processing in accordance with the flow settings information in response to the accumulation data stored in the data storage.

10. A data processing system comprising a plurality of the data processing devices according to claim 1.

11. A data processing method to be executed by a data processing device to be connected to another data processing device, the data processing method comprising:
an acceptance step of accepting settings of a processing flow including a first partial processing and a second partial processing;
a first communication step of transmitting to the another data processing device flow settings information indicating the accepted settings to share with the another data processing device the flow settings information;
an execution step of executing the first partial processing in accordance with the flow settings information; and
a second communication step of executing at least one of transmission of a first processing result obtained by execution of the first partial processing to the another data processing device or reception of a second processing result obtained by execution of the second partial processing by the another data processing device.

12. A non-transitory computer-readable recording medium storing a program causing a computer to be connected to a data processing device to implement:
accepting settings of a processing flow including a first partial processing and a second partial processing;
transmitting to the data processing device flow settings information indicating the accepted settings to share with the data processing device the flow settings information;
executing the first partial processing in accordance with the flow settings information; and
executing at least one of transmission of a first processing result obtained by execution of the first partial processing to the data processing device or reception of a second processing result obtained by execution of the second partial processing by the data processing device.

13. A data processing method to be executed by a data processing device to be connected to another data processing device, the data processing method comprising:
a first communication step of communicating for sharing with the another data processing device flow settings information for executing a first partial processing and a second partial processing that are included in a processing flow;
an execution step of causing a processing unit to execute the first partial processing in accordance with the flow settings information; and
a second communication step of executing at least one of transmission of a first processing result obtained by execution of the first partial processing to the another data processing device or reception of a second processing result obtained by execution of the second partial processing by the another data processing device, wherein
the processing flow includes the first partial processing to be executed in response to accumulation data accumulated in the another data processing device,
the first communication step includes receiving the accumulation data, converting a format of the accumulation data into a format corresponding to an execution controller of the data processing device that executes the execution step, and storing the accumulation data in the converted format into a data storage, and
the execution step includes causing the processing unit to execute the first partial processing in accordance with the flow settings information in response to the accumulation data stored in the data storage.

14. A non-transitory computer-readable recording medium storing a program causing a computer to be connected to a data processing device to function as:
- a first communicator to share with the data processing device flow settings information for executing a first partial processing and a second partial processing that are included in a processing flow;
- an execution controller to cause a processing unit to execute the first partial processing in accordance with the flow settings information; and
- a second communicator to execute at least one of transmission of a first processing result obtained by execution of the first partial processing to the data processing device or reception of a second processing result obtained by execution of the second partial processing by the data processing device, wherein
- the processing flow includes the first partial processing to be executed in response to accumulation data accumulated in the data processing device,
- the first communicator receives the accumulation data, converts a format of the accumulation data into a format corresponding to the execution controller, and stores the accumulation data in the converted format into a data storage, and
- the execution controller causes the processing unit to execute the first partial processing in accordance with the flow settings information in response to the accumulation data stored in the data storage.

* * * * *